US008777752B2

(12) United States Patent
Hall

(10) Patent No.: US 8,777,752 B2
(45) Date of Patent: Jul. 15, 2014

(54) GEOGAME FOR MOBILE DEVICE

(75) Inventor: Robert J. Hall, Berkeley Heights, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 13/333,084

(22) Filed: Dec. 21, 2011

(65) Prior Publication Data

US 2012/0094770 A1  Apr. 19, 2012

Related U.S. Application Data

(63) Continuation-in-part of application No. 12/914,811, filed on Oct. 28, 2010, now Pat. No. 8,702,506, and a continuation-in-part of application No. 12/835,385, filed on Jul. 13, 2010, now Pat. No. 8,355,410, and a continuation-in-part of application No. 12/644,293, filed on Dec. 22, 2009, and a continuation-in-part of application No. 12/404,811, filed on Mar. 16, 2009, now Pat. No. 8,218,463, and a continuation-in-part of application No. 12/220,598, filed on Jul. 25, 2008, now Pat. No. 7,969,914, which is a continuation-in-part of application No. 11/893,813, filed on Aug. 17, 2007, now Pat. No. 8,149,801, which is a continuation of application No. 11/289,899, filed on Nov. 30, 2005, now Pat. No. 7,525,933.

(60) Provisional application No. 61/258,167, filed on Nov. 4, 2009.

(51) Int. Cl.
*G07F 17/32* (2006.01)
*A63F 13/12* (2006.01)
*A63F 1/00* (2006.01)
*A63F 13/10* (2006.01)

(52) U.S. Cl.
CPC . *A63F 1/00* (2013.01); *A63F 13/12* (2013.01); *A63F 2300/556* (2013.01); *A63F 2300/5573* (2013.01); *A63F 2300/406* (2013.01); *A63F 2300/5533* (2013.01); *A63F 13/10* (2013.01)
USPC ......................................................... 463/42

(58) Field of Classification Search
USPC ............................................................ 463/42
See application file for complete search history.

(56) References Cited

U.S. PATENT DOCUMENTS 6,015,344 A   1/2000  Kelly et al.
6,119,976 A   9/2000  Rogers
(Continued)

FOREIGN PATENT DOCUMENTS

WO   WO 2007/016641 A2   2/2007

OTHER PUBLICATIONS

Various Authors, The Wikipedia page for the "Snake" computer game, Nov. 3, 2008 version, Wikipedia.com, downloaded by the USPTO from http://en.wikipedia.org/w/index.php?title=Snake_ (video_game)&oldid=249370716 on Oct. 4, 2012.*

(Continued)

*Primary Examiner* — Pierre E Elisca
(74) *Attorney, Agent, or Firm* — Baker & Hostetler LLP

(57) ABSTRACT

A geogame utilizes wireless devices to track the movements of the players. As players move, virtual tails are generated behind each player, and their locations are determined and geocast, via a wireless geographic broadcast protocol, to all players of the geogame. Each player observes all players movements and tail locations on his/her wireless device. Players can draw sketches utilizing their respective virtual tails and/or players can traverse courses which involve various types of terrain. Players can try to avoid virtual obstacles that can be generated within the game. Players can be provided weapons to shoot through boundaries and tails.

20 Claims, 36 Drawing Sheets

(56) References Cited

U.S. PATENT DOCUMENTS

| | | | |
|---|---|---|---|
| 6,195,751 B1 | 2/2001 | Caronni et al. |
| 6,304,556 B1 | 10/2001 | Haas |
| 6,428,470 B1 | 8/2002 | Thompson |
| 6,628,620 B1 | 9/2003 | Cain |
| 6,781,971 B1 | 8/2004 | Davis et al. |
| 6,807,165 B2 | 10/2004 | Belcea |
| 6,816,460 B1 | 11/2004 | Ahmed et al. |
| 6,870,846 B2 | 3/2005 | Cain |
| 6,879,574 B2 | 4/2005 | Naghian et al. |
| 6,909,706 B2 | 6/2005 | Wilmer et al. |
| 6,937,602 B2 | 8/2005 | Whitehill et al. |
| 6,940,832 B2 | 9/2005 | Saadawi et al. |
| 6,954,435 B2 | 10/2005 | Billhartz et al. |
| 6,958,986 B2 | 10/2005 | Cain |
| 7,027,822 B1 | 4/2006 | Hwang et al. |
| 7,152,110 B2 | 12/2006 | Pierce |
| 7,179,166 B1 | 2/2007 | Abbott |
| 7,197,326 B2 | 3/2007 | Acampora |
| 7,295,521 B2 | 11/2007 | Choi et al. |
| 7,307,978 B2 | 12/2007 | Carlson |
| 7,525,933 B1 | 4/2009 | Hall |
| 7,613,467 B2 | 11/2009 | Fleischman |
| 7,813,326 B1 | 10/2010 | Kelm et al. |
| 7,864,168 B2* | 1/2011 | French ............... 345/204 |
| 7,917,169 B1 | 3/2011 | Hall |
| 7,957,390 B2 | 6/2011 | Furlong et al. |
| 7,969,914 B1 | 6/2011 | Gerber |
| 8,001,189 B2 | 8/2011 | Nielsen et al. |
| 8,074,275 B2 | 12/2011 | Ramaiah et al. |
| 8,085,813 B2 | 12/2011 | Melick et al. |
| 8,128,405 B2 | 3/2012 | Preston et al. |
| 8,248,367 B1 | 8/2012 | Barney et al. |
| 8,332,544 B1* | 12/2012 | Ralls et al. ............. 710/8 |
| 8,341,271 B2 | 12/2012 | Cho et al. |
| 8,359,643 B2 | 1/2013 | Low et al. |
| 8,376,857 B1 | 2/2013 | Shuman et al. |
| 8,483,652 B2 | 7/2013 | Hall |
| 2002/0113872 A1 | 8/2002 | Kinjo |
| 2002/0141454 A1 | 10/2002 | Muniere |
| 2002/0155846 A1 | 10/2002 | Shiraga |
| 2002/0163912 A1 | 11/2002 | Carlson |
| 2002/0167960 A1 | 11/2002 | Garcia-Luna-Aceves |
| 2003/0193394 A1 | 10/2003 | Lamb |
| 2003/0235158 A1 | 12/2003 | Lee |
| 2004/0185881 A1 | 9/2004 | Lee et al. |
| 2004/0213270 A1 | 10/2004 | Su et al. |
| 2005/0058151 A1 | 3/2005 | Yeh |
| 2005/0096065 A1* | 5/2005 | Fleischman ............ 455/456.1 |
| 2005/0152318 A1 | 7/2005 | Elbatt et al. |
| 2005/0152378 A1 | 7/2005 | Bango et al. |
| 2005/0203922 A1* | 9/2005 | Uhlir et al. ............. 707/100 |
| 2005/0254453 A1 | 11/2005 | Barneah |
| 2005/0259597 A1 | 11/2005 | Benedetto |
| 2006/0013154 A1 | 1/2006 | Choi et al. |
| 2006/0023677 A1 | 2/2006 | Labrador |
| 2006/0084444 A1 | 4/2006 | Kossi et al. |
| 2006/0126535 A1 | 6/2006 | Sherman |
| 2006/0128349 A1 | 6/2006 | Yoon |
| 2006/0148516 A1 | 7/2006 | Reddy et al. |
| 2006/0153157 A1 | 7/2006 | Roh et al. |
| 2007/0008925 A1 | 1/2007 | Dravida et al. |
| 2007/0019594 A1 | 1/2007 | Perumal et al. |
| 2007/0110092 A1 | 5/2007 | Kangude et al. |
| 2007/0198731 A1 | 8/2007 | Li et al. |
| 2007/0217346 A1 | 9/2007 | Zheng |
| 2007/0259716 A1 | 11/2007 | Mattice et al. |
| 2007/0259717 A1 | 11/2007 | Mattice et al. |
| 2007/0263571 A1 | 11/2007 | Hermann et al. |
| 2007/0265088 A1 | 11/2007 | Nakada et al. |
| 2007/0265089 A1 | 11/2007 | Robarts et al. |
| 2007/0266396 A1 | 11/2007 | Estermann |
| 2007/0287437 A1 | 12/2007 | Cartmell |
| 2008/0015024 A1* | 1/2008 | Mullen ............... 463/42 |
| 2008/0039113 A1 | 2/2008 | Liu et al. |
| 2008/0058099 A1 | 3/2008 | Schwartz et al. |
| 2008/0080401 A1 | 4/2008 | Ribiere |
| 2008/0144493 A1 | 6/2008 | Yeh |
| 2008/0159236 A1 | 7/2008 | Ch'ng |
| 2008/0163355 A1 | 7/2008 | Chu |
| 2008/0186206 A1 | 8/2008 | Reumerman |
| 2008/0192737 A1 | 8/2008 | Miyazaki |
| 2008/0262928 A1 | 10/2008 | Michaelis |
| 2009/0017913 A1 | 1/2009 | Bell et al. |
| 2009/0030605 A1 | 1/2009 | Breed |
| 2009/0041039 A1 | 2/2009 | Bear |
| 2009/0045977 A1 | 2/2009 | Bai et al. |
| 2009/0046628 A1 | 2/2009 | Hall |
| 2009/0138353 A1 | 5/2009 | Mendelson |
| 2009/0175223 A1 | 7/2009 | Hall |
| 2009/0201860 A1 | 8/2009 | Sherman et al. |
| 2009/0207783 A1 | 8/2009 | Choi et al. |
| 2009/0245518 A1 | 10/2009 | Bae et al. |
| 2009/0248420 A1 | 10/2009 | Basir |
| 2009/0298461 A1 | 12/2009 | O'Reilly |
| 2009/0323579 A1 | 12/2009 | Bai et al. |
| 2009/0325603 A1 | 12/2009 | Van Os et al. |
| 2010/0008259 A1 | 1/2010 | Yoon et al. |
| 2010/0029245 A1 | 2/2010 | Wood et al. |
| 2010/0042601 A1 | 2/2010 | Kelley et al. |
| 2010/0060480 A1 | 3/2010 | Bai et al. |
| 2010/0064307 A1 | 3/2010 | Malhotra et al. |
| 2010/0067451 A1 | 3/2010 | Hall |
| 2010/0069109 A1 | 3/2010 | Hall |
| 2010/0074234 A1 | 3/2010 | Banks et al. |
| 2010/0082513 A1 | 4/2010 | Liu |
| 2010/0150129 A1 | 6/2010 | Jin et al. |
| 2010/0162149 A1 | 6/2010 | Sheleheda et al. |
| 2010/0169009 A1 | 7/2010 | Breed et al. |
| 2010/0214987 A1 | 8/2010 | Mori |
| 2010/0215040 A1 | 8/2010 | Kappler et al. |
| 2010/0226342 A1 | 9/2010 | Colling et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0279776 A1 | 11/2010 | Hall |
| 2010/0287011 A1 | 11/2010 | Muchkaev |
| 2010/0304759 A1 | 12/2010 | Leppanen |
| 2010/0329463 A1 | 12/2010 | Ratliff et al. |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |
| 2011/0177829 A1 | 7/2011 | Platt et al. |
| 2011/0230202 A1 | 9/2011 | Wood et al. |
| 2011/0244887 A1 | 10/2011 | Dupray et al. |
| 2011/0299685 A1 | 12/2011 | Hall |
| 2012/0016940 A1 | 1/2012 | Hall |
| 2012/0058814 A1 | 3/2012 | Lutnick et al. |
| 2012/0079080 A1 | 3/2012 | Pishevar |
| 2012/0108326 A1 | 5/2012 | Hall |

OTHER PUBLICATIONS

Nicklas, Daniela, and Bernhard Mitschang. "On building location aware applications using an open platform based on the NEXUS Augmented World Model." Software and Systems Modeling 3.4 (2004): 303-313.*

Nintendo, The computer game "Mario Kart DS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.*

Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.*

Winkler, Additional date evidence for the Ars Electronica organization archive document http://archive.aec.at/submission/2004/U19/1043/, retrieved from http://web.archive.org/web/20050508084628/http://www.aec.at/en/archives/prix_archive/prix_projekt.asp?iProjectID=12899.*

(56) References Cited

OTHER PUBLICATIONS

U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.
U.S. Appl. No. 13/169,829, filed Jun. 27, 2011, Hall.
U.S. Appl. No. 13/277,895, filed Oct. 20, 2011, Hall.
U.S. Appl. No. 13/327,472, filed Dec. 15, 2011, Hall.
Ko et al., "Geocasting in Mobile Ad Hoc Networks: Location-based Multicast Algorithms", Technical Report TR-98-018 Texas A&M University, Sep. 1998.
Ko, et al., "Flooding-Based Geocasting Protocols for Mobile Ad Hoc Networks," Mobile Networks and Applications, Dec. 2002, 7, 471-480.
Hall et al., "A Two-Level Quality of Service Scheme for Collision based on Mobile Ad Hoc Networks", IEEE, 1-4244-1513-06/07, 2007, 8 pages.
Hall, "RTEQ: Modeling and Validating Infinite-State Hard-Real-Time Systems", AT&T Labs Research, ASE 2007, Nov. 2007, 4 pages.
Hall, "Cheating Attacks and Resistance Techniques in Geogame Design," Proc. 2010 ACM FuturePlay Symposium, 2010, 82-89.
Hall, "An Improved Geocast for Mobile Ad Hoc Networking," IEEE Transactions on Mobile Computing, 2010, 1-14.
Illyas, "Body Personal, and Local Ad Hoc Wireless Networks", Chapter 1, CRC Press, 2003, 22 pages.
Liao et al., "GRID: A Fully Location-Aware Routing Protocol for Mobile Ad Hoc Networks", Telecommunication Systems, 2001, 18, pp. 1-26.
Shih et al., A Distributed Slots Reservation Protocol for QoS Routing on TDMA-based Mobile Ad Hoc Networks, 2004, (ICON 2004), Proceedings, 12$^{th}$ IEEE International Conference, Nov. 2004, 2, 660-664.
Shih et al., "CAPC: A Collision Avoidance Power Control MAC Protocol for Wireless Ad Hoc Networks", IEEE Communications Letters, Sep. 2005, 9(9), 859-861.
Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.
Corbett, et al. "A Partitioned Power and Location Aware MAC Protocol for Mobile Ad Hoc Networks," Technical Report No. 553, University of Sydney, School of Information Technologies, Jul. 2004, 7 pages.
Panta, "GeoV2V: Vehicular Communications Using a Scalable Ad Hoc Geocast Protocol," AT&T Labs Research, 14 pages.
Balasubramaniam, et al. "Interactive WiFi Connectivity for Moving Vehicles," Proceedings of SIGCOMM, Aug. 17-22, 2008, 12 pages.
Maihofer, "A Survey of Geocast Routing Protocols," IEEE Communications Surveys, Jun. 2004, 32-42.
Das, et al., "SPAWN: A Swarming Protocol for Vehicular Ad-Hoc Wireless Networks," Proceedings of 1$^{st}$ ACM Vanet, Oct. 2004, 2 pages.
German Aerospace Center, Simulation of Urban Mobility, 2010, http://sumo.sourceforgenet, 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Heissenbüttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem in a Mobile Ad Hoc Network," Proceedings of the 5$^{th}$ Annual ACM/IEEE International Conference on Mobile Computing and Networking, ACM, 1999, 151-162.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.
Niculescu, et al., "Trajectory Based Forwarding and Its Applications," Proc. Mobicom 2003, ACM, 2003, 13 pages.
Ns-2, "The Network Simulator," 2010, http://isi.edu/nsnam/ns, 2 pages.
Schwingenschlogl, "Geocast Enhancements of AODV for Vehicular Networks," ACM SIGMOBILE Mobile Computing and Communications Review, Jun. 2002, 18 pages.
Shevade, et al., "Enabling High-Bandwidth Vehicular Content Distribution," Proceedings of CoNEXT 2010, Nov. 30-Dec. 3, 2010, 12 pages.
Yassein, et al., "Performance Analysis of Adjusted Probabilistic Broadcasting in Mobile Ad Hoc Networks," Proc. 11$^{th}$ Intl. Conf. on Parallel and Distributed Systems Workshops, 2005, 27 pages.
Zahn, et al., "Feasibility of Content Dissemination Between Devices in Moving Vehicles," Proceedings of CoNEXT 2009, Dec. 1-4, 2009, 11 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.
Social + Gaming—SWiK: http://swik.net/social+ gaming.
http://askville.amazon.com/Wii-games-play-Internet-Family/ AnswerViewer.do?requestId=6796582(2007).
Schutzberg, "Phone-based GPS-based Games: Missing Pieces"; http://www.directionsmag.com/articlephp?article_id=939 (Aug. 17, 2005).
"*Boost Mobile Introduces First Location-based, GPS games in US*" http://www.physorg.com/news5824.html (Aug. 16, 2005).
"*Sony bigwig hints at GPS-enabled PSP games*"; http:www.vespacious.com/sony-bigwig-hints-at-gps-enabled-psp-game.html (Dec 22, 2008).
*STEVE:"GPS-enabled Cell Phone Games*" http://www.strangenewproducts.com/2005/08/gps-enabled-cell-phone-games.html (Aug. 15, 2005.
*Location-Enabled Mobile Gaming*; http://www.nn4d.com/site/global/market/affiliate_sites/lbsglobe/lbsappplications/mobilegaming.isp (2007).
U.S. Appl. No. 13/683,025, filed Nov. 21, 2012, Panta.
U.S. Appl. No. 13/712,353, filed Dec. 12, 2012, Hall.
Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
bzflag(6):tank battle game—linux man page, Google date Feb. 1, 2001, downloaded from http://linux.die.net/man/6/bzflag.
de Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14

(56) References Cited

OTHER PUBLICATIONS pages, downloaded from http://www.dialogic.com/-/media/products/docs/signaling-and-ss7-components/9862_Add_Locationbased_Servs_an.pdf.

Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.

Halas, Jacek, "Ghost Recon: Advanced Warfighter Game Guide, [Mission 01] Contact! —Objective: Locate Ramirez with the Drone", 2007, downloaded from http://guides.gamepressure.com/ghostreconadvancedwarfighter/guide.asp?ID=986.

Hohfeld, Alexander, "In and out of reality: Janus-faced location awareness in ubiquitous games", Journal of Software, 2(6), Dec. 2007, 86-92.

Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.

Lindo, Wayne A. et al., "Network modeling and simulation in the OneTESS program", Fall Simulation Interoperability Workshop 2006, Orlando, Florida, USA, Sep. 10-15, 2006, 155ff.

MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.

Santos, Nuno et al., "Vector-field consistency for ad-hoc gaming", Middleware 2007, LNCS 4834, 2007, pp. 80-100.

Sotamaa, Olli, "All the world's a Botfighter Stage: Notes on location-based multi-user gaming", Proceedings of Computer Games and Digital Cultures Conference, Tampere University Press, 2002, pp. 35-44.

U.S. Appl. No. 13/875,735, filed May 2, 2013, Hall.
U.S. Appl. No. 13/890,423, filed May 9, 2013, Hall.

* cited by examiner

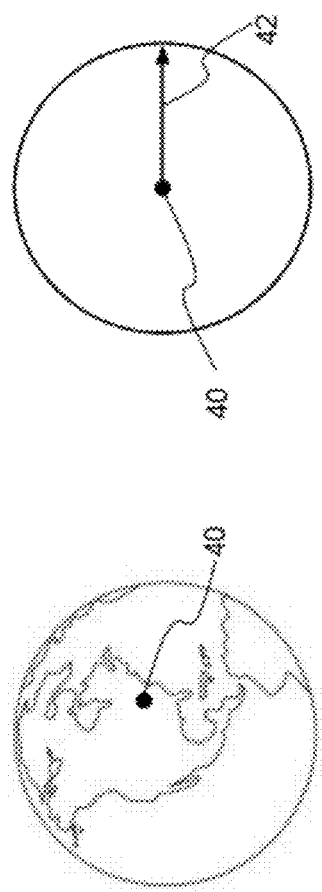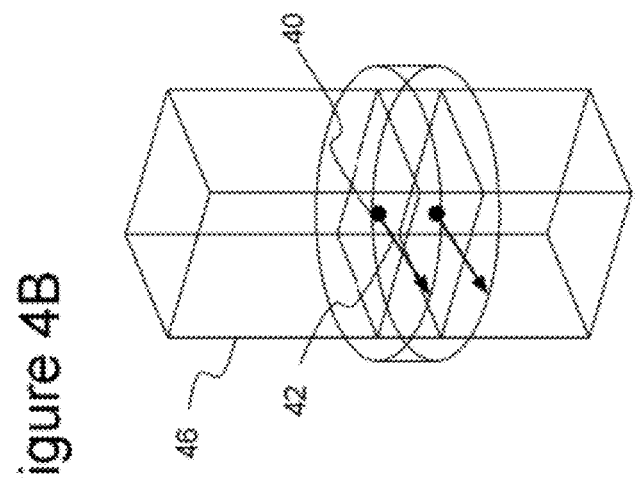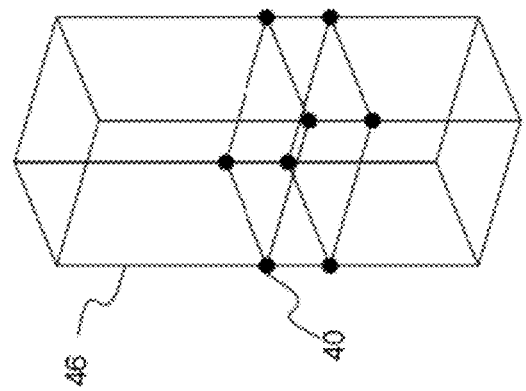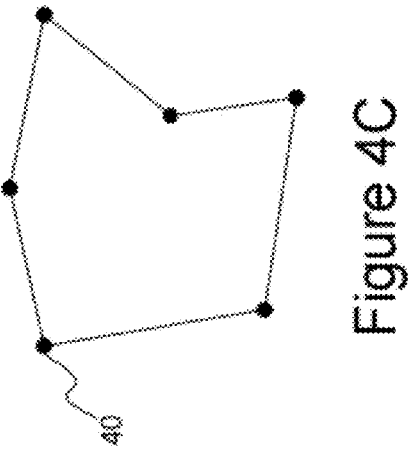
Figure 4A
Figure 4B
Figure 4C
Figure 4D
Figure 4E
FIGURE 4

GEOGAME FOR MOBILE DEVICE

CROSS REFERENCE TO RELATED APPLICATIONS

The instant application is a continuation in part of U.S. patent application Ser. No. 12/914,811, entitled "Geogame For Mobile Device," filed Oct. 28, 2010, which is incorporated herein by reference in its entirety. U.S. patent application Ser. No. 12/914,811 claims priority to U.S. provisional patent application No. 61/258,167, filed Nov. 4, 2009, entitled "Geocasting, Mobile Ad-Hoc Networks, Scalable Wireless Geocast Protocols, And Applications Thereof," which is incorporated herein by reference in its entirety. U.S. patent application Ser. No. 12/914,811 is a continuation-in-part of U.S. patent application Ser. No. 12/644,293, entitled "Augmented Reality Gaming Via Geographic Messaging," filed Dec. 22, 2009, which is incorporated by reference herein in its entirety. U.S. patent application Ser. No. 12/644,293 claims priority to U.S. provisional patent application No. 61/258,167, filed Nov. 4, 2009, which is incorporated herein by reference in its entirety. U.S. patent application Ser. No. 12/914,811 is a continuation-in-part of U.S. patent application Ser. No. 12/835,385, entitled "Location Based Mobile Gaming Application And Method For Implementing The Same Using A Scalable Tiered Geocast Protocol," filed Jul. 13, 2010, which is incorporated by reference herein in its entirety. U.S. patent application Ser. No. 12/835,385 claims priority to U.S. Application No. 61/258,167 filed Nov. 4, 2009, which is incorporated by reference in its entirety. U.S. patent application Ser. No. 12/835,385 is a continuation-in-part of U.S. application Ser. No. 11/893,813, filed Aug. 17, 2007, U.S. application Ser. No. 12/220,598, filed Jul. 25, 2008, and U.S. application Ser. No. 12/404,811, filed Mar. 16, 2009, each of which is incorporated in its entirety herein by reference. U.S. application Ser. No. 12/404,811 is a continuation of U.S. application Ser. No. 11/289,899, entitled "System And Method For Mobile Ad Hoc Network," filed Nov. 30, 2005, which is incorporated herein by reference in its entirety.

TECHNICAL FIELD

The technical field generally relates to games based on the geographic location (geolocation-based gaming or geogaming) of the players, and more specifically to geolocation-based gaming using a scalable tiered geocast protocol.

BACKGROUND

Video games are extremely popular. As a result of advances in technology, physical activity of a player can be incorporated into a video game (e.g., Nintendo's® Wii™) Players of video games involving physical activity and/or movement are typically limited to playing the games within restricted environments. For example, players of many gaming systems interact with the gaming system via wired and/or wireless controllers. The controllers have a limited range, thus, limiting physical video games to indoor use within a limited range from a gaming console and/or home entertainment system. Even wireless controllers limit game play to a small portion of a room by ultra short-range signals used to allow a player to see the video monitor. Often game consoles must be positioned on a stable, flat surface, and require 110 volt connections to a power supply. These characteristics leave gaming consoles with little to no portability.

Multiplayer versions of video games involving physical movement typically allow multiple players to compete against one another. Players may be located within one physical area, with simultaneous access to one gaming console, or may be located at various physical areas and link up over a network such as the Internet. Despite the physical distance separating them, players engaged in a multiplayer game from different physical locations still have the above described limited movement restriction imposed upon them. Further, these games typically rely on the constant presence of wireless and/or wireline network connectivity. If access to the network is interrupted, for even very short periods of time, the multiplayer gaming experience can be deteriorated or lost altogether. Thus, it is sometimes not possible to enjoy multiplayer gaming involving physical movement at all, for example in a remote geographic area with limited or no network service available.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

Various types of geographic location based games (geogames) and mechanisms for implementing geogames are described herein. Also described is a geographic broadcast ("geocast") protocol for implementing geogames. In an example geogame, players (actual persons) can utilize mobile communications devices to play a game in which players move within a defined boundary or region throughout the game. As players move, virtual tails can be generated behind the players. The locations of players and their respective tails can be displayed on the mobile communications devices. As players move, their locations can be determined and geocast to all players of the game. In various embodiments, players can generate sketches of objects with the virtual tails and/or players can traverse courses which involve various types of terrain. In other example embodiments, players can try to avoid virtual obstacles that can be generated within the game. In various example embodiments, the virtual objects can remain stationary, move in accordance with deterministic patterns, move randomly, chase players, or any appropriate combination thereof. In various embodiments, game players can compete with other players, game players can compete with metrics (e.g., previous score, previous time, etc.), game play can be non-competitive, or any appropriate combination thereof.

In various embodiments, game players can be required to continuously move within a defined boundary or region throughout the game. Game players can be provided "weapons" to shoot through a boundary and/or a virtual tail. If a player stops moving, the player can be expelled from the game. If a player exits the confines of the boundary/region without shooting the boundary with a weapon, the player can be expelled from the game. If a player crosses a virtual tail, whether the player's tail or another player's tail, without shooting the virtual tail with a weapon, the player can be expelled from the game.

BRIEF DESCRIPTION OF THE DRAWINGS

Reference is made here to the accompanying drawings, which are not necessarily drawn to scale.

FIG. 4, comprising FIG. 4A-FIG. 4E depict example geocast regions or boundaries.

FIG. 5B depicts a geogame play boundary/region located at two different, distinct, physical locations.

FIG. 6A and FIG. 6B, depicts renderings of multiple players and multiple tails in multiple geogame boundaries/regions.

FIG. 7 depicts a list from which a player can select a destination, termination, boundary, region, or the like.

DETAILED DESCRIPTION OF ILLUSTRATIVE EMBODIMENTS

Figure 1:
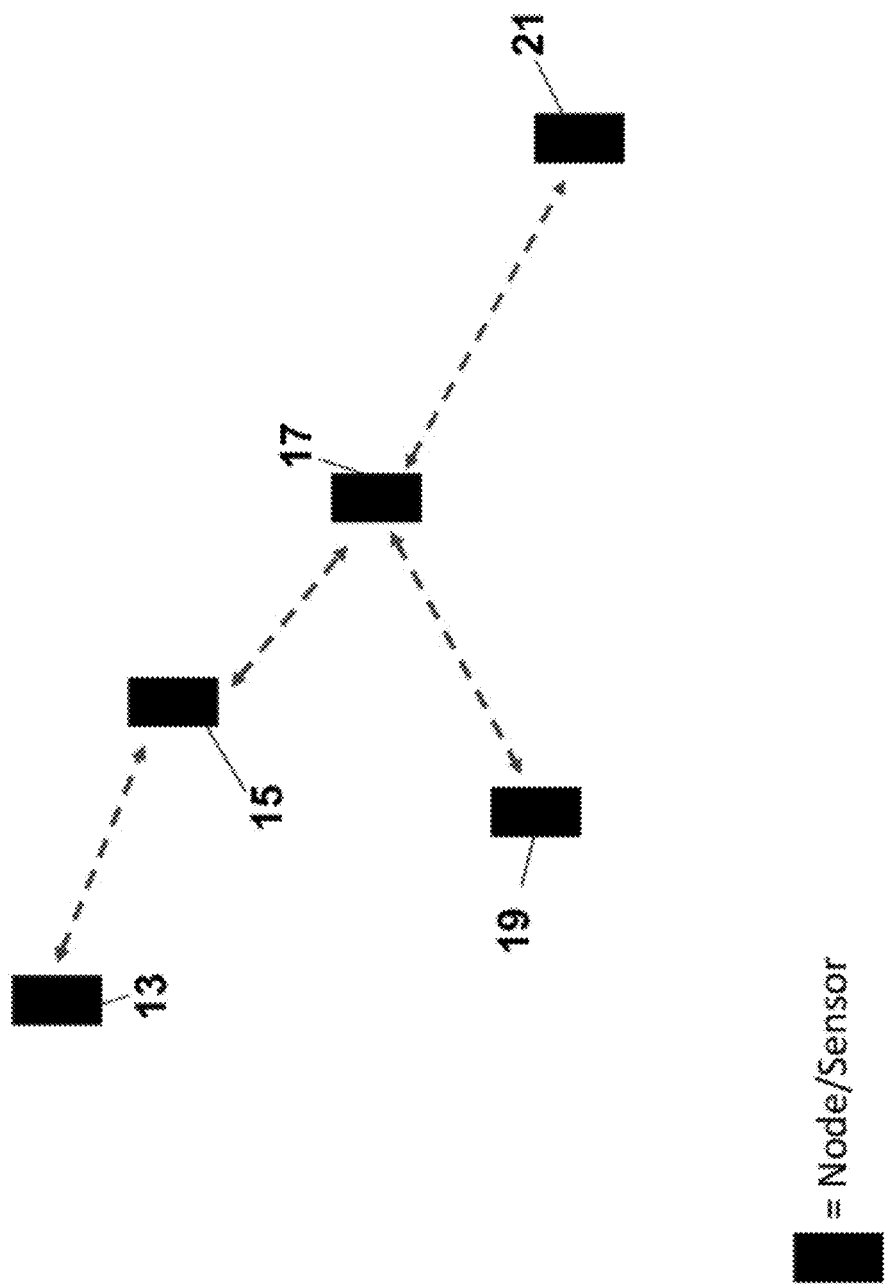
FIG. 1 illustrates an example mobile ad hoc network in which geogaming may be implemented.

Aspects of the instant disclosure are described more fully herein with reference to the accompanying drawings, in which example embodiments are shown. In the following description, for purposes of explanation, numerous specific details are set forth in order to provide a understanding of the various embodiments. However, the instant disclosure may be embodied in many different forms and should not be construed as limited to the example embodiments set forth herein. Like numbers refer to like elements throughout.

Various embodiments of geographic location based gaming, referred to as geogaming, and implementation mechanisms for geogaming are described herein. The described embodiments are merely examples that may be embodied in various and alternative forms, and combinations thereof. As used herein, for example, "exemplary," and similar terms, refer expansively to embodiments that serve as an illustration, specimen, model, or pattern, and should not be construed to mean preferred or advantageous over other aspects or designs, nor is it mean to preclude equivalent exemplary structures and techniques known to those of ordinary skill in the art. The figures are not necessarily to scale and some features may be exaggerated or minimized, such as to show details of particular components. In some instances, well-known components, systems, materials, or methods have not been described in detail in order to avoid obscuring the instant disclosure. Therefore, specific structural and functional details disclosed herein are not to be interpreted as limiting, but rather as a basis for the claims and as a representative basis for teaching one skilled in the art how to employ the teachings instant application in various ways.

While the description includes a general context of computer-executable instructions, geogaming also can be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, or the like.

Geogames, as described herein, can involve vigorous physical activity in outdoor natural settings such as parks, camps, or athletic fields. The geogames can be designed for commercial location-aware smartphones carried or worn by players, without requiring consoles or internet connections. Geocast games described herein can illustrate how physical athletic play can be combined with real time strategic, imaginative, and creative cognitive play from the domain of digital games to produce sports appealing to a wide range of ever more sophisticated players.

In an example geogame embodiment, a player can generate a virtual tail in order to generate a sketch, or the like. Groups of players can work together to sketch objects (e.g., figures, images, shapes, etc.) in the virtual world. Players may move through boundaries (e.g., walls) and virtual tails without penalty. Each player in a game can choose a virtual tail color. The group can plan a coordinated set of movements, and can execute them in the real world.

In another example embodiment, an intense version of the geogame can involve traversing rugged terrain such as, for example forest, hills, drop-offs, fences, etc. This embodiment could require a player to maneuver an obstacle course equipped with various types of obstacles (e.g., walls to climb, balance beams, etc.). In an example embodiment, the terrain could be more parkour-style with could require players to perform various physical maneuvers such as, for example, rolling, vaulting, climbing, jumping, etc.

In an example embodiment, virtual obstacles can be added to the geogame. Virtual objects and randomness can make a player's task successively more difficult over time. Over time, during game play, virtual objects could appear in the virtual world. Players can try to avoid virtual obstacles that can be generated within the game. As described in more detail herein, a game player can be penalized for coming into contact with a virtual object. A penalty could include expulsion from a game, time added to game play time, a reduction in score, or the like, or any appropriate combination thereof. Virtual objects can remain stationary, move in accordance with deterministic patterns, move randomly, chase players, vary with time, or any appropriate combination thereof.

In various example embodiments, a player can be given, or obtain (e.g., via achieving a predetermined score or time) a weapon with which the player can shoot through a boundary, a virtual tail, and/or a virtual object. After the player moves through the boundary, virtual tail, and/or virtual object, the respective boundary, virtual tail, and/or virtual object can be regenerated. If a player exits the confines of the boundary/region without shooting the boundary with a weapon, the player can be expelled from the game. If a player crosses a virtual tail, whether the player's tail or another player's tail, without shooting the virtual tail with a weapon, the player can be expelled from the game. If two virtual tails of two different players cross, both players can be expelled from the game.

As well as group or team play, various geogame embodiments can be played by one player (solitaire mode). In solitaire mode, a player can strive to achieve specific goals. For example, in an embodiment of the geogame in which virtual objects are general, which a player is to avoid, the player can play to see how long the player can last as the available space grows smaller and more complex and the hazards increase in number and unpredictability.

In an example embodiment, geogaming can be implemented via a scalable, wireless, geographic broadcast ("geocast") protocol. Geogaming via a geocast protocol can enable multiplayer gaming between mobile communication devices, such as wireless terminals (WTs) without relying on traditional network elements. No gaming console need be required, thus eliminating the venue restrictions imposed by wired controllers and/or wireless controllers with limited ranges. Geogames can be played in wide open spaces, either indoors or outdoors. Geogaming can be fully distributed over an ad hoc network of mobile communications devices, eliminating the need for traditional mobile communications infrastructure and central servers. Because no network infrastructure is required to play, geogaming can take place in remote areas with little or no network access; for example in the middle of the woods. The scalable nature of the geocast protocol can enable geogames to function equally well in both remote areas and crowded areas containing both geogame players and other users of mobile communications devices. Because multiplayer geogames do not require constant communication with a central server, game play can be more physically active and geographically wide ranging. Geogaming using tiered geocasting can enable geogame players to participate in multiplayer gaming spanning great distances. For example, players on separate continents may participate in a single multiplayer geogame.

WTs taking part in a geogame can be programmed with a geogaming application, which uses geolocation information obtained from a locating system, such as, for example, a global positioning system (GPS), or the like.

The geogaming application of each WT in the game can control a position of a simulated or virtual player based on location data received from the location system. In some embodiments, the geogaming application in the WT can use movement data from an inertial unit, or the like, of the WT to control a posture and/or movement of a virtual player, to render (e.g., display) a posture and/or movement of an actual player, to determine and control locations of virtual tails, and/or to render locations of virtual tails.

The scalable tiered geocast communication protocol can be programmed into each WT taking part in the geogame, and any WT that operates to relay communications to or from the WTs taking part in the geogame. The WTs taking part in the geogame can share changed game conditions, such as WT geolocation, between them via geocast data packets transmitted over one or both of a first tier, short-range, network, and a second tier, long-range, network according to transmission heuristics of the tiered geocast protocol.

As described herein, players can utilize WTs to play a geogame in which players can be required to continuously move within a defined boundary throughout the geogame while avoiding obstacles. As players move, virtual tails can be generated behind the players. A virtual tail can continuously trail it respective player. Obstacles can include physical objects, such as, for example, buildings, trees, rocks, or the like, and virtual obstacles, such as virtual tails, and the boundaries of geogame play. As players move, their locations can be determined and geocast to all players of the geogame. The locations of the players and their respective tails can be displayed on the WTs of each player. In an example embodiment, a player's WT can determine if the player is to be expelled from the geogame in accordance with the rules of the geogame. If a player stops moving, the player can be expelled from the geogame. If a player crosses a virtual tail, whether the player's tail or another player's tail, the player can be expelled from the geogame. If a player exits the confines of the boundary/region, the player can be expelled from the geogame. The last player remaining can be the winner.

In another example embodiment of the geogame, a single player can play within the same rules, striving to maximum time in play. In various example embodiments, rather than being expelled from a game for any of the aforementioned violations, a player may be penalized by, for example, being assessed a penalty point or points that are subtracted from a player's score, having time subtracted from a player's score, or any combination thereof. Thus, the winner of a game could be the player at the end of the game (as mutually determined or determined by time), with the greatest number of points and/or greatest amount of time.

A virtual tail can, in an example embodiment, comprise tail segments. In another example embodiment, a virtual tail can comprise a single tail. Each tail, or tail segment, can have two ends. One of the two ends can represent the least recent location of the device, and the other end can represent the most recent location of the device. For example, one end of a tail can represent the starting location of a device, and the other end can represent the current location of the device. In an example embodiment, tail segments can be removed from the tail as time progresses. Thus, one end of such a tail could represent the least recent location of the device, but not necessarily the starting location of the device. And, the other end of such a tail could represent the current location of the device.

In an example embodiment, each WT taking part in a geogame can be programmed with the scalable tiered geocast communication protocol. One example of a type of scalable protocol is the mobile ad hoc network geocast protocol. Using the tiered geocast protocol, geogaming can be occasioned in all types of network scenarios, including those in which relevant areas are densely populated with participating WTs, those in which areas are sparsely populated, and even in areas long-range infrastructure such as cell towers, Wi-Fi hotspot or other internet router are not reachable by the WTs taking part in the game.

Geocast protocols differ from a traditional Internet protocol (IP) such as the uniform datagram protocol (UDP) in that messages are addressed to a destination geocast region instead of an IP address, such as an UDP address. Utilizing the geocast protocol, WTs in a target area do not need to register to a group address, as required of some other protocols. In some example embodiments, each geocast data packet can be assigned, at origination, a globally unique packet serial number. The unique packet serial number can be read by participating devices according to the protocol to, for example, determine whether a particular data packet is being received for a first time or has been received before. The packet serial number and all other packet information may be positioned in a header or body of the data packet.

The geogaming application is in some embodiments configured to store pre-set or previously identified geocast destination, locations, boundary, region, or the like, and allow the initiating player to select appropriately for geocasting.

Geocast data packets can be transmitted according to heuristics of a tiered geocast protocol, which is described in more detail herein, to a destination geocast region for reception by all devices located in the region that are programmed with the geocast protocol, i.e., participating devices.

Although basic geocasting over only a single network (e.g., long-range network) can enable communications in some situations where traditional networking is impractical or inadequate, it may be that, in some embodiments, one may selectively geocast over one or more of two or more networks (i.e., tiers) versus the flat configuration of a single network. The tiered geocast protocol of the present disclosure improves on single-network geocasting by providing the heuristics, or decision rules, for selectively propagating geocast data packets within a relatively short-range, peer-to-peer network, and bridging packets onto a long-range network for long-distance transport depending on various circumstances. Each participating WT and other nodes (e.g., Wi-Fi access point or other router) can have forwarding rules, including geographical parameters, and a look-up table for use in implementing the rules.

In an example embodiment, the geocast system can be configured such that a transmitting WT receives a confirmation that a geocast data packet was transmitted successfully. For example, it is contemplated that at least one of the WTs in a geocasting destination region, even if not a WT actively participating in the game, could return geocast a confirmation data packet indicating that the packet was received by a WT in the region. In one contemplated embodiment, although the protocol is based on a geographical address and not a device-specific address, a device-specific address of a target WT participating in the game is included in a geocast and the target WT initiates inclusion in a return geocast data packet of a confirmation of receipt message to the originating WT.

In addition, in some embodiments, a geocast data packet can include one or more fields, such as in a header or body of the packet, in which information related to a path taken by a packet is recorded. For example, a receiving node (e.g., WT or Internet router) receiving a geocast can retrieve data from the geocast header to identify an ordered list of the nodes whose transmissions led to the receiving node receiving it. In this way, path discovery may be integrated into the transmission process. Any node can also use this information to send a source-routed unicast back to any node along the path, which is termed reverse-path forwarding (RPF).

Although a two-tiered communication system, including a first short-range peer-to-peer network and a long-range network, is described herein, the geogaming application of the present disclosure may be implemented in connection with a protocol and communication system using other types of networks as well as or instead of those described herein, and in connection with more than two network tiers.

Propagations over the short-range network can be made between devices programmed with the scalable tiered geocast protocol, whereby adjacent devices are within range of each other, such as radio range (e.g., 100 meters). The WTs and tiered geocast protocol can be configured to transmit geocast data packets over one or more short-range networks, including existing wireless local area networks (WLANs), such an IEEE 802.11 network. As an example, when a first gaming WT is about 900 meters from an edge of a geocasting region including a second gaming WT, a geocast data packet from the first device could be broadcasted and participating intermediate devices could receive and retransmit the geocast data packet until it reached the geocast region, without need for transmission over an Internet router or other base station. In this example, depending on the location of a retransmitting device, the geocast data packet can be broadcast to the geocast region in one or two hops.

Geogaming may be particularly suited to highly mobile devices without requiring connection to an infrastructure-based communications network. A mobile ad hoc network is an example of such a set of devices. Mobile ad hoc networks can extend the reach of data networking into areas and scenarios in which infrastructure-based networking is impossible or impractical. For example, mobile ad hoc networks can allow first responders to use networked messaging and information applications in a zone where the network infrastructure has been destroyed by a disaster. Mobile ad hoc networks can provide military units operating in battlefield situations lacking infrastructure the same types of benefits as infrastructure-based networks. Mobile ad hoc networks can allow networking among low resource nodes, such as man-worn devices powered by lightweight wearable batteries, by allowing units to relay each other's short-range transmissions, instead of each unit transmitting long range directly to the destination.

To better understand geogaming and applications thereof, a description of mobile ad hoc networks is provided. In is to be understood however, that applications of geogaming are not limited to mobile ad hoc networks. Rather, geogaming is applicable to any appropriate device or group of devices.

A mobile ad hoc network can comprises communications devices (also referred to as nodes) that communicate with each other via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and is incorporated by reference herein in its entirety. Geocasting can use a protocol in which an IP address is replaced with a geographic address. Thus, each geocast message can comprise an indication of a location of a geographic region of intended reception of the geocast message. Generally, a packet may be sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. No registration need be required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices may communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device may be capable of receiving and/or transmitting data packets to and/or from other communications devices in the mobile ad hoc network.

In an example embodiment, a communications device can transfer packets to other communications devices according to heuristic decision rules that determine whether a receiving device will re-transmit a received packet. These rules can effectively guide packets to their destinations and control communication traffic within the ad hoc network. The decision rules can achieve this control by using statistics obtained and recorded by a communications device as it receives packets transmitted within reception range within its environment. This distributed packet transfer mechanism cab result in packets "flowing" to and throughout the geocast region specified in each packet. The communications devices in the geocast region can receive and process each distinct packet, typically rendering the content to the user via a user interface of a communications device. Two packets may be distinct if they contain distinct geocast identifiers. However, a re-transmitted copy of a packet generally will contain the same geocast identifier as the original packet.

FIG. 1 illustrates an example mobile ad hoc network in which a mobile device configured to facilitate distribution of media via an ad hoc geographic routing/broadcast (geocast) protocol may be implemented. Communications devices, also referred to herein as devices, mobile devices, or nodes, in the mobile ad hoc network can communicate via RF encoded with geographic information, via Bluetooth technology, via Wi-Fi (e.g., in accordance with the 802.11 standard), or the like, or any combination thereof. For example, as depicted in FIG. 1, communication devices 13, 15, 17, 19, and 21 can form a mobile ad hoc network. As shown in FIG. 1, communication device 13 can communicate with communications device 15 directly (e.g., via Bluetooth). Communication device 15 can communicate with communications device 17, and thus can retransmit information received from communications device 13 to communications device 17, and vice versa (retransmit information received from communications device 17 to communications device 13). Communications device 17 can communicate with communications devices 19 and 21, and can relay information from/to communications devices 19 and/or 21 to/from communications devices 13 and/or 15.

Although not depicted in FIG. 1, it is possible, in a mobile ad hoc network, that, for a pair of nodes (A and B for example), node A can receive from node B but node B cannot receive from node A. In an example embodiment, this asymmetric style of communication may be potentially likely in a mobile ad hoc network.

In an example embodiment, communications devices that receive a message, such as a query or a response, can resend the query/response in accordance with the scalable wireless geocast protocol. For example, a communication device's ability to retransmit a query/response can be based on the number of times the query/response was previously received, the communication device's proximity with respect to the communications devices from which the query/response was sent, and/or the communication device's proximity to the geocast region. This can be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. First, in accordance with the location-based approach, the receiving communication device determines whether it has previously received the same query/response at least a predetermined number (N) of times. If not, it retransmits the query/response over the ad hoc network of communications devices. If so, the communications device progresses to the second step and determines whether the sending communications device is closer than some minimum distance away. If no prior transmitter of the query/response was closer than some minimum distance away, the communications device retransmits the query/response over the ad hoc network of communications devices. Otherwise, the communications device progresses to the third step and determines whether it is closer to the center of the geocast region than any sending communications device from which the query/response was received. If so, the communications device transmits the query/response over the ad hoc network of communications devices. If not, the communications device does not retransmit the query/response.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned above, a mobile ad hoc network does not require a communications network infrastructure or a Wi-Fi access point. However, in an example configuration, a mobile ad hoc network can utilize Wi-Fi access points and/or a communications network infrastructure.

Figure 2:
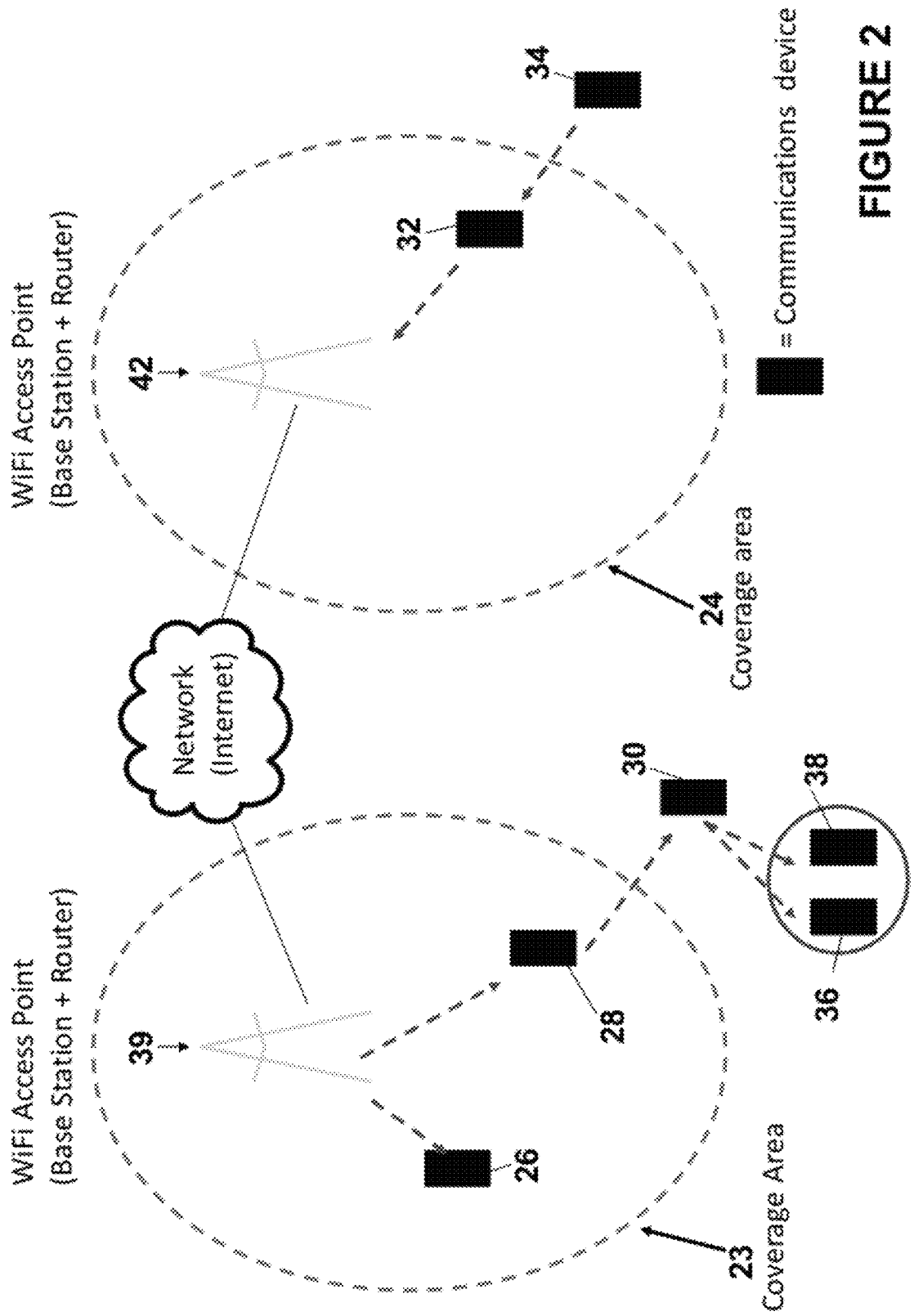
FIG. 2 illustrates example communications in an ad hoc network in which geogaming can be implemented via a Wi-Fi access point.

FIG. 2 illustrates an example ad hoc network utilizing a Wi-Fi access point. As depicted in FIG. 2, communication devices 26, 28, 30, 36, and 38 form a mobile ad hoc network and communication device 32 and 34 form another mobile ad hoc network. Coverage area 23, which is the area covered by a Wi-Fi access point 39, covers communication devices 26 and 28. Coverage area 24, which is the area covered by another WiFi access point 42 covers communication device 32. As shown in FIG. 2, communication device 34 transmits to communication device 32 directly (e.g., via Bluetooth). Communication device 32 retransmits to a WiFi access point 42 which in turn may retransmit to the other WiFi access point 39 via a network such as the Internet, for example. Communication devices 26 and 28 receive the transmission from the WiFi access point 39, and communication device 28 retransmits directly to communication device 30. And, as depicted, communication device 30 retransmits to other communication devices 36 and 38.

Figure 3:
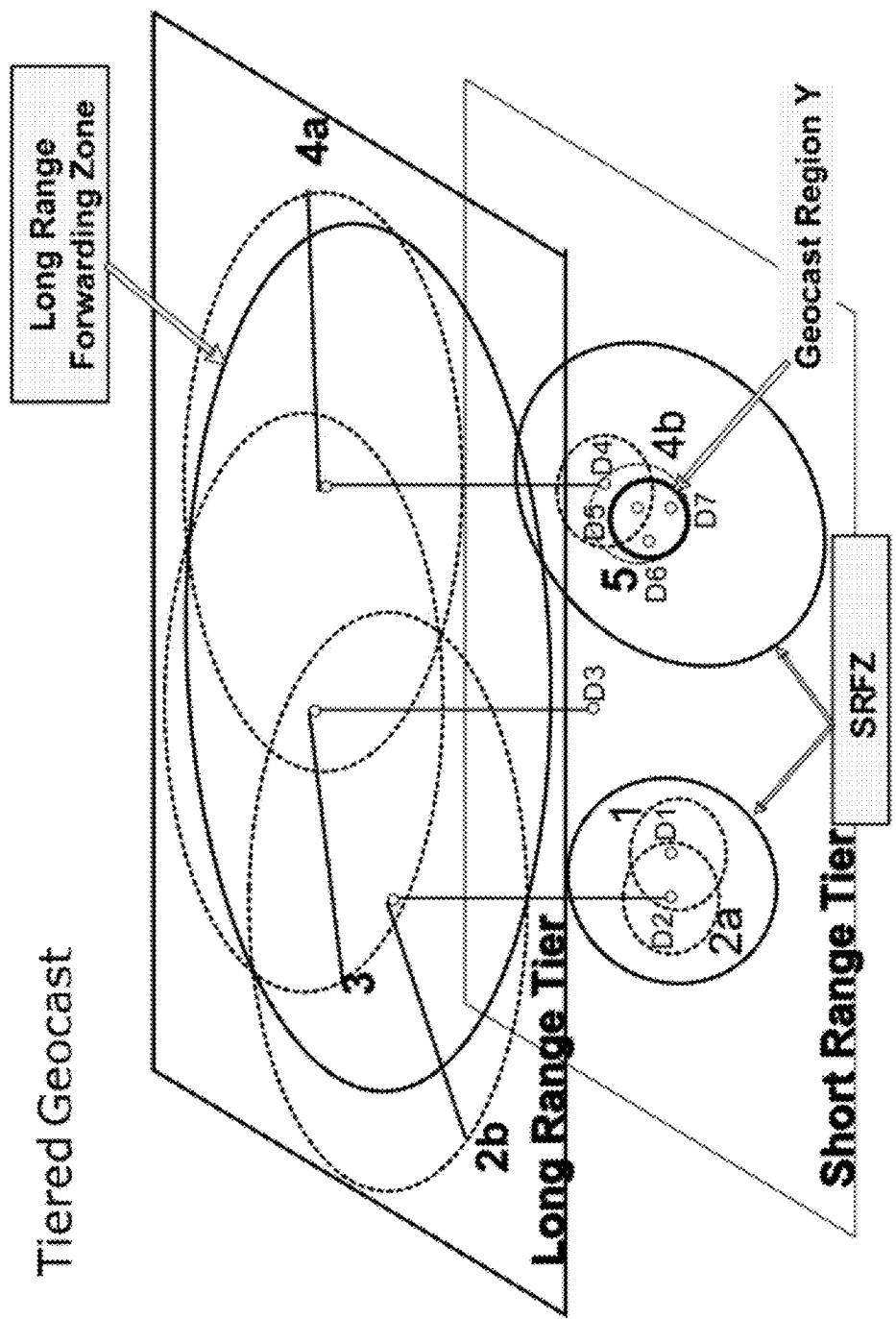
FIG. 3 illustrates an example mobile ad hoc network in which geogaming can be implemented utilizing tiered geocasting and forwarding zones.

FIG. 3 illustrates an example mobile ad hoc network in which distribution of media via an ad hoc geographic routing/broadcast (geocast) protocol can be implemented utilizing tiered geocasting and forwarding zones. Tiered geocasting uses long range (LR) transmitters (such as communications devices, etc.), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 3, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2*a*), within the short range tier and in accordance with the heuristics for the short range forwarding zone (SRFZ) as well as within the long range tier (transmission 2*b*). Communications D2, with long range transmission capability (in the long range tier) retransmits in the long range tier as well (transmission 2*b*). Communications device D3 receives the transmission 2*b* from communications device D2 and retransmits (as transmission 3) in the long range tier only. Communications device D4 receives the transmission 3 from communications device D3 and retransmits both on the long and short range tiers, resulting in transmission 4*a* in the long range tier and 4*b* in the short range tier. Communications device D5, within geocast region Y, receives the transmission 4*a*, and in turn retransmits (transmission 5) within the geocast region Y. Transmission 5 is received by the other devices in geocast region Y, namely devices D6 and D7, thus completing the geocast message transfer.

Geocast origination, destination, and termination regions can be defined by geographic parameters and may have any size and shape. As examples, the regions may be defined by three or more bounding geographic coordinates, forming a triangle, rectangle, or other shape, or a single geographic coordinate and a radius or diameter, forming a geocast region.

FIG. 4, comprising FIG. 4A, FIG. 4B, FIG. 4C, FIG. 4D, and FIG. 4E depicts example geocast regions or boundaries which can be utilized to facilitate distribution of media via a geocast protocol. A geocast region may be defined to be a single point 40, as depicted in FIG. 4A. A point geocast region may be defined by a longitude value and a latitude value (not shown). A point above the surface of the earth could be defined by providing an altitude value in addition to longitude and latitude values. A geocast region may also comprise multiple single points (not shown) such as the single point 40. Location points such as point 40 may be used as the building blocks for more complex geocast region geometries, as described herein. FIG. 4B depicts a geocast region defined by a point 40 in combination with a radius 42. The geocast region of this example will comprise the area enclosed by the radius, and may include the space above the area as well. A geocast region could also be defined as the overlap region between two or more circular geocast regions (not shown). FIG. 4C depicts a more complex geometry formed from a series of points 40 interconnected with straight boundary lines. This technique of geocast region definition is similar to the techniques typically used in the definition of parcels of real property. FIGS. 4D and 4E depict the creation of one or more geocast regions within a single geographic footprint. FIG. 4D depicts creating a geocast region for a specific floor of a building 44. The single floor geocast region is defined as the volume of space between upper and lower areas, each formed using a series of points 40 set at corners of the buildings. FIG. 4E depicts an alternate technique for defining a single floor geocast region in building 44. Upper and lower points 40 are defined in the middle of the ceiling and the floor of the geocast region respectively. The single floor geocast region is then defined as the volume of space between an upper area and a lower area defined by a pair of radii 42 extending from the middle points. Geocast regions may also be defined to change in size, geographic location, etc. with time (not shown), essentially allowing the creation of geocast regions in four dimensions. For example a region may be defined to change size, shape, and/or geographic location over time as the number of participating nodes fluctuates. Information defining a particular geocast region (e.g., a series of points) can be communicated in an addressing portion of a geocast message. Geocast sub-regions may be defined within a particular geocast region using the above techniques. It should be noted that the techniques described with reference to FIGS. 4A-4E are merely examples, and the scope of the instant disclosure should not be limited thereto. Other region geometries and techniques for defining regions may be recognized by those skilled in the art, and are meant to be included within the scope of the instant disclosure.

In some embodiments, a geocast region can be selected by making one or more selections on a map and/or from a list. A region can be selected from a list displayed on a mobile communications device, or the like. The list can comprise real world locations. For example, one can scroll through a list by touching the display surface of a mobile communications device, or the like, by providing a voice command (e.g., "Scroll List"), by entering text on which to search, by moving the device, or any appropriate combination thereof. In another example embodiment, the selection of a region, or the like can be made by selecting a location on the map by a finger, fingers, and/or any other appropriate device, and, for example, dragging away or gesture-pinching, from the selected location to create the size of the a circle, oval, rectangular, square, polygon, or any appropriate shape (two dimensional or three dimensional) representing a destination, termination, boundary, region, or the like. In various example embodiments, locations, such as addresses, and/or region dimensions, building names, institution names, landmarks, etc. may be input in other ways by a player, such as by typing, gesture, and/or voice input. Indeed, many variations of textual, graphical, and audio inputs, either alone or in combination, may be utilized for selecting a geocast region in accordance with example embodiments of the present disclosure.

Figure 5:
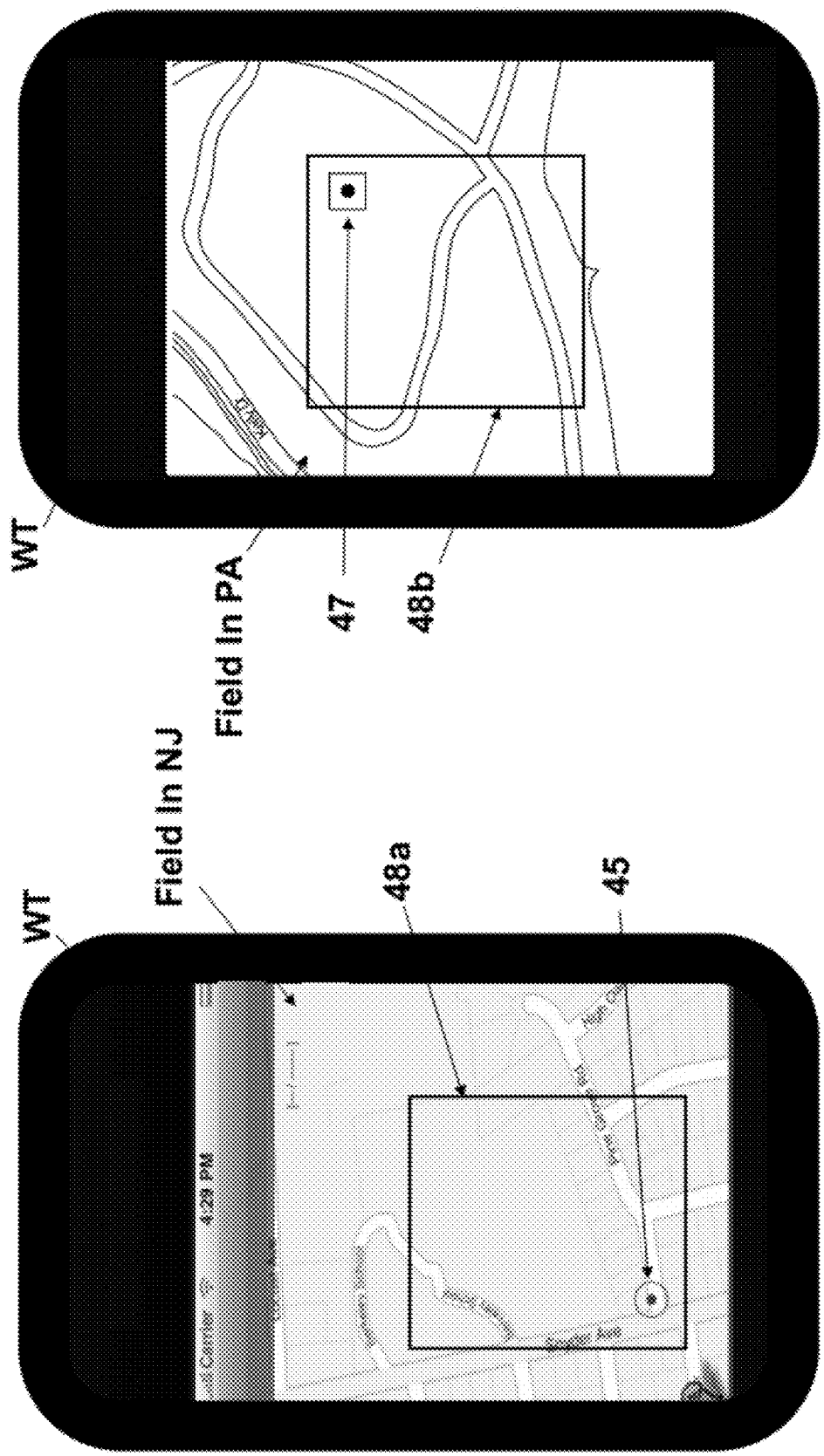
FIG. 5, comprising FIG. 5A

FIG. 5 depicts a geogame play boundary/region located at two different, distinct, physical locations. As shown in FIG. 5A, geogame boundary/region 48a is physically located in a field in New Jersey. As shown in FIG. 5B, geogame boundary/region 48b is physically located in a field in Pennsylvania. In an example scenario, as depicted in FIG. 5, player 45 has selected boundary/region 48a. When player 47 joins the geogame, the location of player 47 is determined and a corresponding boundary/region 48b is determined for player 47. In the example embodiment depicted in FIG. 5, the area and dimensions of boundaries/regions 48a and 48b are the same. In other example embodiments, the area, volume, and dimensions of multiple boundaries/regions are the same. After the geogame starts, locations of players and tails are rendered on each player's WT. The locations of players and tails are appropriately correlated to be rendered similarly with the boundary/region being rendered.

Figure 6:
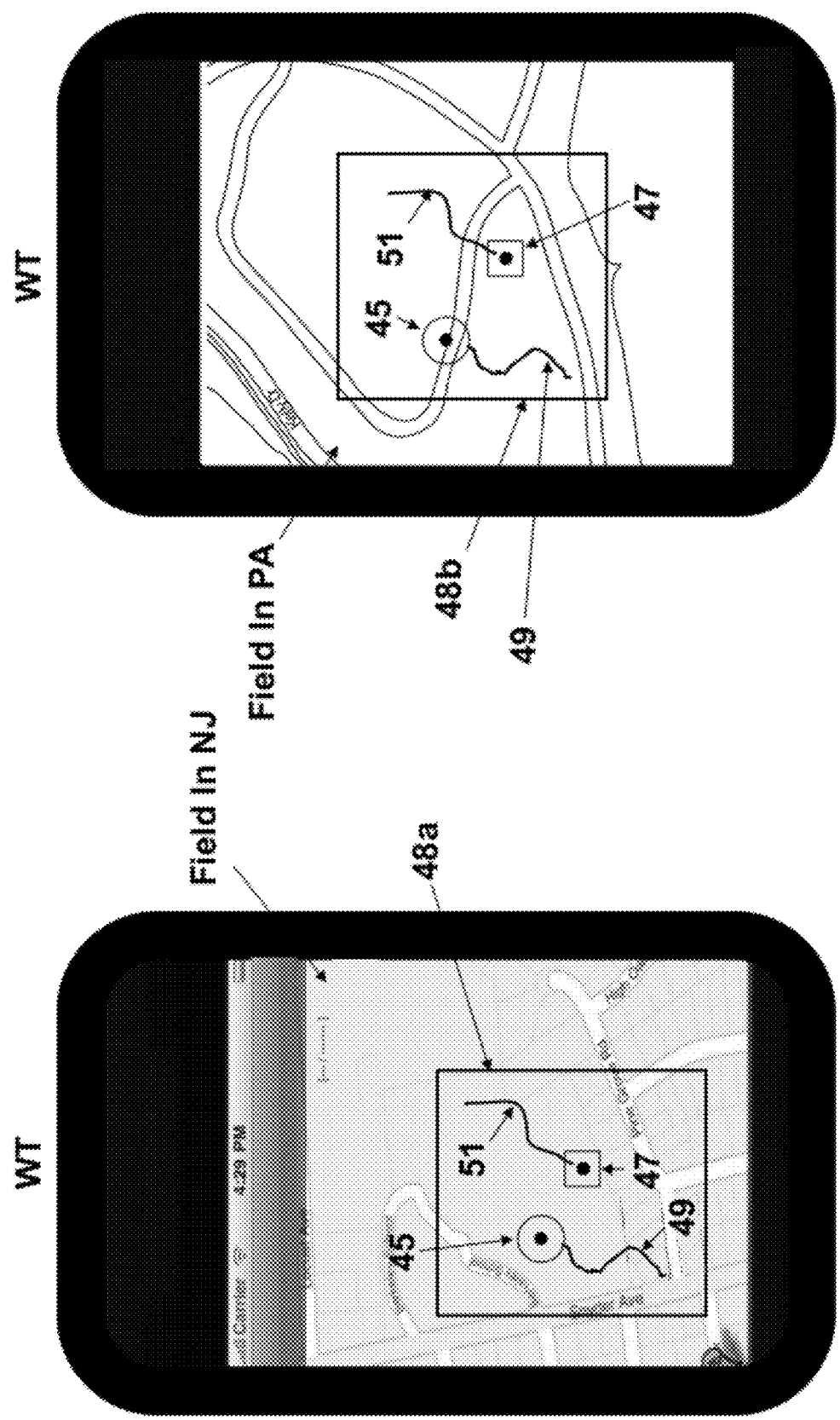
FIG. 6, comprising

FIG. 6 depicts renderings of multiple players and multiple tails in multiple geogame boundaries/regions. Player 45 has a tail 49 and player 47 has a tail 51. As player 45 moved from his original position to the current position depicted in FIG. 6A, his tail 49 shows the path of travel taken by player 45. The location of player 45 and his tail 49 is rendered within boundary/region 48a on the WT of FIG. 6A. The WT of FIG. 6A geocast information associated with the location of player 45 and his tail 49 relative to the dimensions of boundary/region 48a, which is received by the WT of FIG. 6B. Accordingly, the location of player 45 and his tail 49 is rendered within the boundary/region 48b, on the WT of FIG. 6B. The location of player 45 and his tail 49 is rendered within the boundary/region 48b in the same relative position as rendered in boundary/region 48a. Still in accordance with this example scenario, as player 47 moved from her original position to the current position depicted in FIG. 6B, her tail 51 shows the path of travel taken by player 47. The location of player 47 and her tail 51 is rendered within boundary/region 48b on the WT of FIG. 6B. The WT of FIG. 6B geocast information associated with the location of player 47 and her tail 51 relative to the dimensions of boundary/region 48b, which is received by the WT of FIG. 6A. Accordingly, the location of player 47 and her tail 51 is rendered within the boundary/region 48a, on the WT of FIG. 6A. The location of player 47 and her tail 51 is rendered within the boundary/region 48a in the same relative position as rendered in boundary/region 48b.

Figure 7:
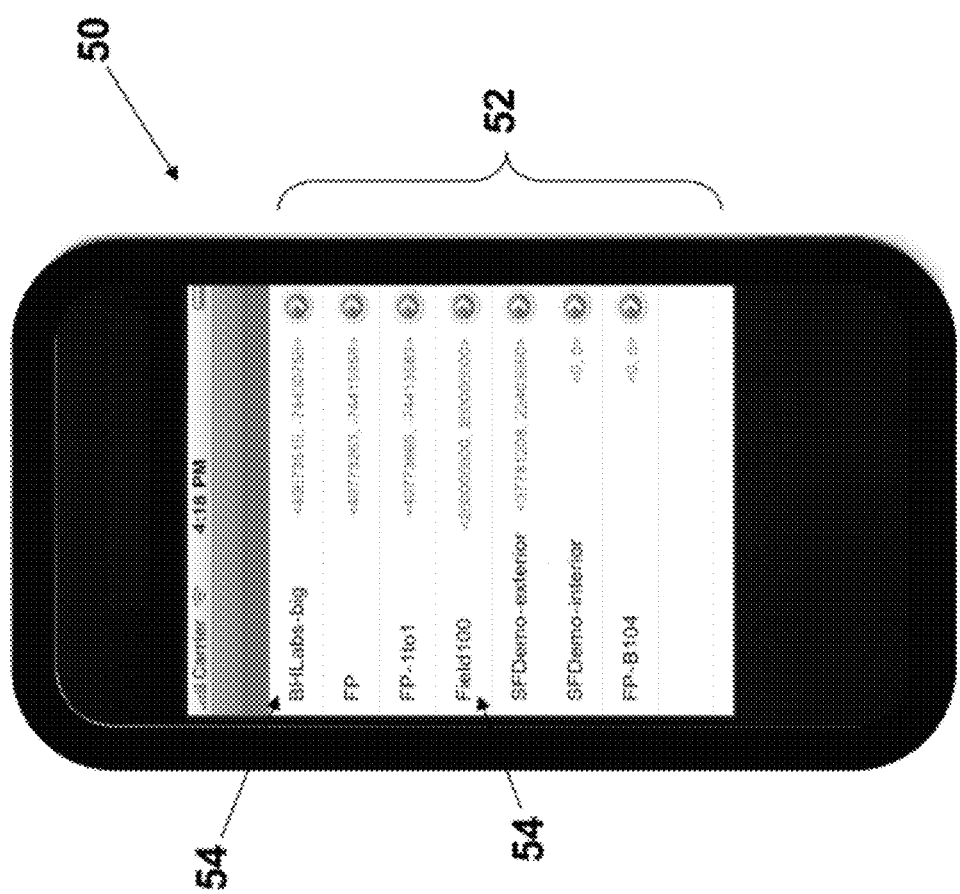

FIG. 7 depicts a list from which a player can select a destination, termination, boundary, region, or the like. As shown in FIG. 7, a player can select a destination, termination, boundary, region, or the like from a list 52 displayed on mobile communications device (WT) 50. The list can comprise real world locations, virtual locations, or any combination thereof. For example, as depicted, item 54 on the list 52 represents a real world location—a building. Item 54 on the list 52 represent a virtual field designated filed 100. A player can search items on the list in any appropriate manner. For example, a player can scroll through the list by touch the display surface of WT 50, by providing a voice command (e.g., "Scroll List"), by entering text on which to search, or any appropriate combination thereof.

In an example embodiment, the selection of a destination, termination, boundary, region, or the like can be made by selecting a location on the map by a finger, fingers, and/or any other appropriate device, and, for example, dragging away or gesture-pinching, from the selected location to create the size of the a circle, oval, rectangular, square, polygon, or any appropriate shape (two dimensional or three dimensional) representing a destination, termination, boundary, region, or the like. In various example embodiments, locations, such as addresses, and/or region dimensions, building names, institution names, landmarks, etc. may be input in other ways by a player, such as by typing, gesture, and/or voice input.

Figure 8:
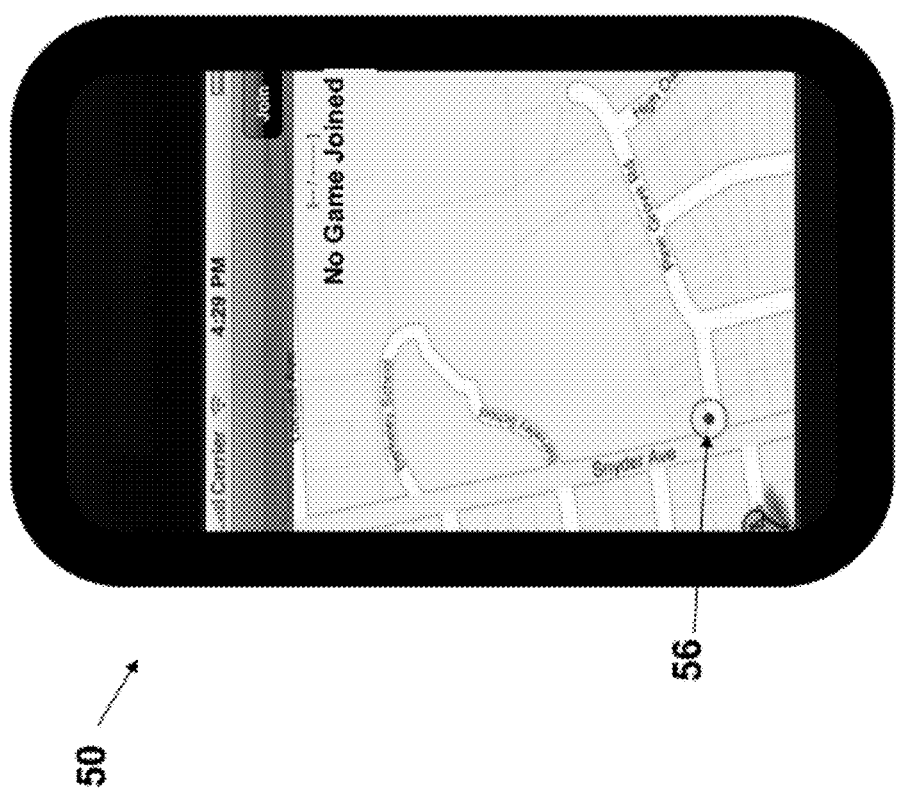
FIG. 8 depicts a position of a user/player on a map displayed on a mobile device.

FIG. 8 depicts a position 56 of a user on a map displayed on WT 50. Before a user joins a game, the user can indicate his/her position by tapping a point on a map with a finger and/or any appropriate device. In another example embodiment, a user can enter coordinates or any appropriate indication of a location via text, voice, gesture, or any appropriate combination thereof.

Figure 9:
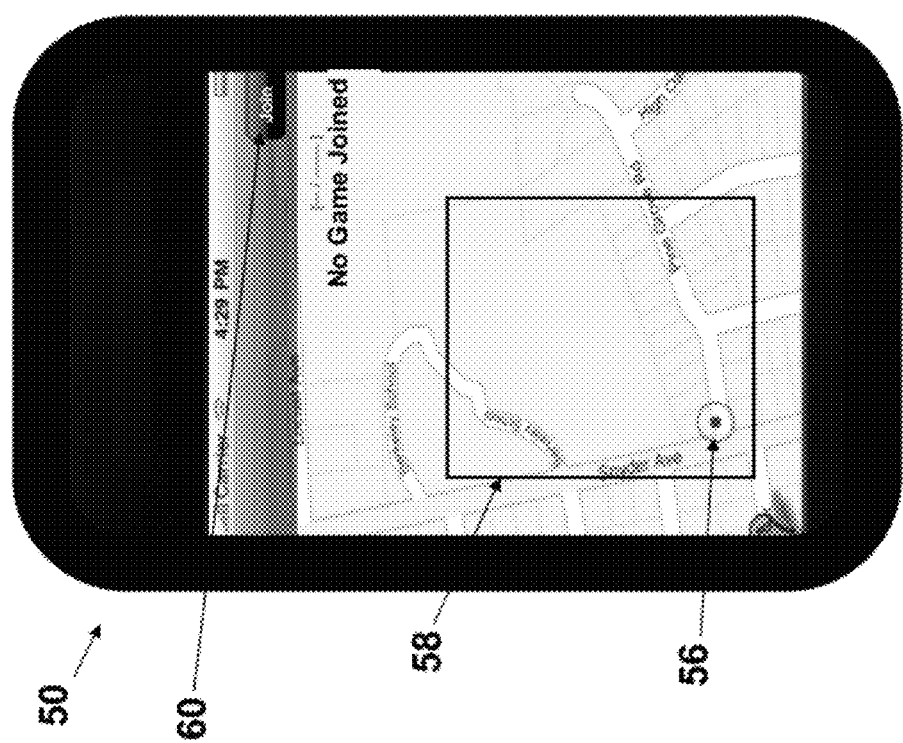
FIG. 9 depicts a boundary/region on a map displayed on a mobile device.

FIG. 9 depicts a boundary/region 58 on a map displayed on WT 50. The region 58 can be generated in any appropriate manner. For example, a user can enter coordinates, perimeter information, location information, or the like via text, voice, gesture, or any appropriate combination thereof. A user can tap the map or drag a finger and/or any appropriate device to define the game region 58. In an example embodiment, a geogame can be declared by tapping the join indication 60 of the display of the WT 50. At that point, other players can join the geogame. In an example embodiment, for another user to join the geogame, he/she must be in the geogame region 58.

Figure 10:
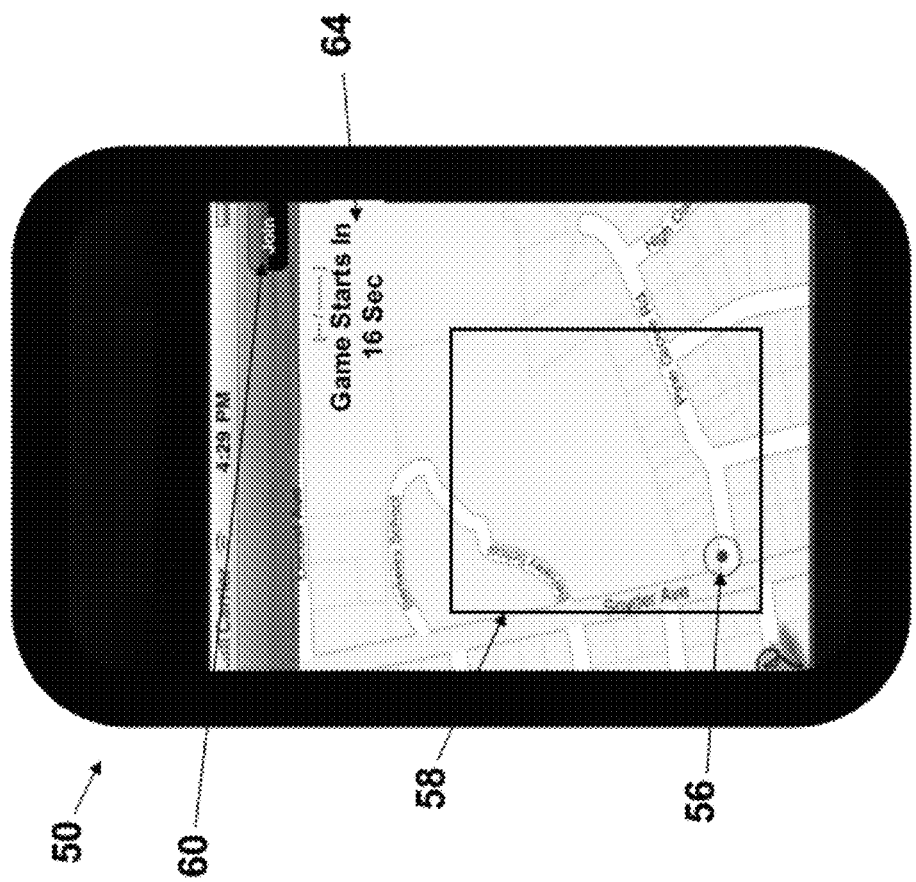
FIG. 10 depicts an example rendering of a start time.

FIG. 10 depicts an example rendering of a start time. In an example embodiment, a user can tap the join indicator 60, and the start time will be rendered on the WT 50. The start time can be rendered visually, audibly, mechanically (vibration), or any combination thereof. The start time can be rendered in any appropriate format. For example, the start time can be a time of day (e.g. 4:05 PM Eastern Standard Time), a count down timer (e.g., time remaining until start of geogame in seconds, minutes, hours, days, etc.), or the like. As depicted in FIG. 10, a user has tapped join indicator 60 and a rendering on the display of WT 50 as shown in display area 64, indicates that the geogame will start in 16 seconds. As time progresses, the indication of time in display area 64 will decrement to zero. At time zero, the game begins.

Figure 11:
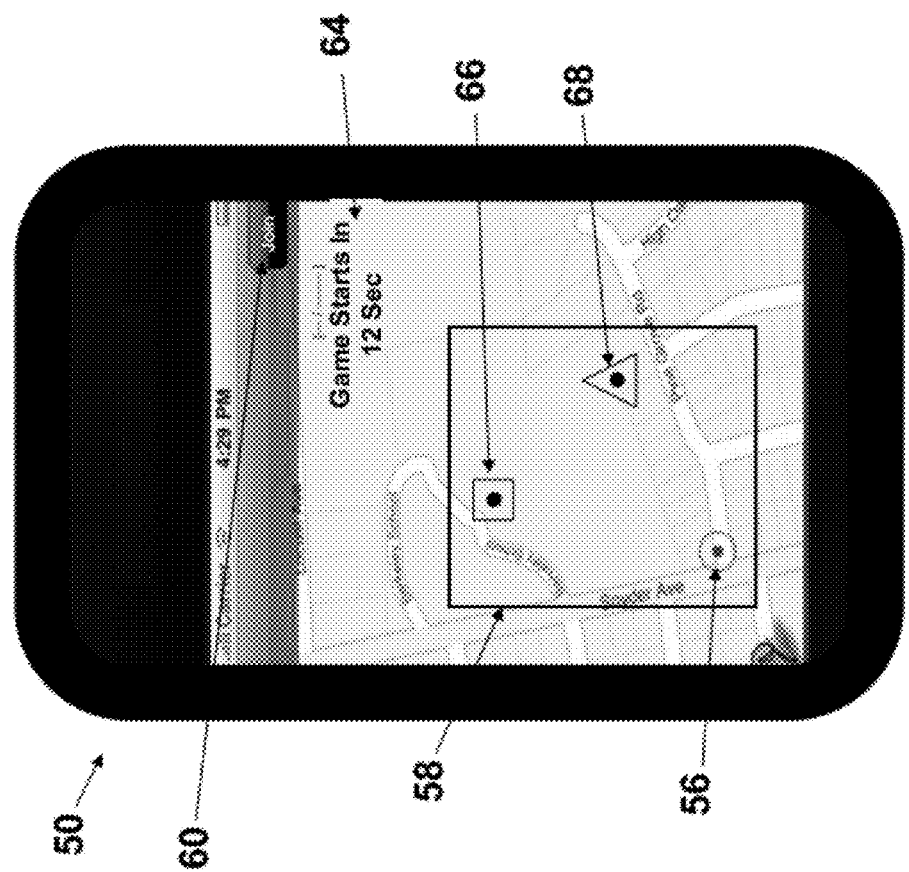
FIG. 11 is an example depiction of multiple players having joined the geogame.

FIG. 11 is an example depiction of multiple players having joined the geogame. Others can join the game prior to start time. In an example embodiment, a user requesting to play must be within the boundary/region 58 when requesting to play. As depicted in FIG. 11, players 66 and 68 have joined the game. The respective locations of players 66 and 68 are rendered on the WT 50. As a player joins the geogame, the location of the player is determined and geocast. Other WTs in the geocast region will receive the geocast message comprising the locations of the other players. Players can be rendered in any appropriate format. For example, players can be rendered in different colors, by different shapes, via animation, via icons, via text, via numbers, via avatars, or the like, or any combination thereof.

Figure 12:
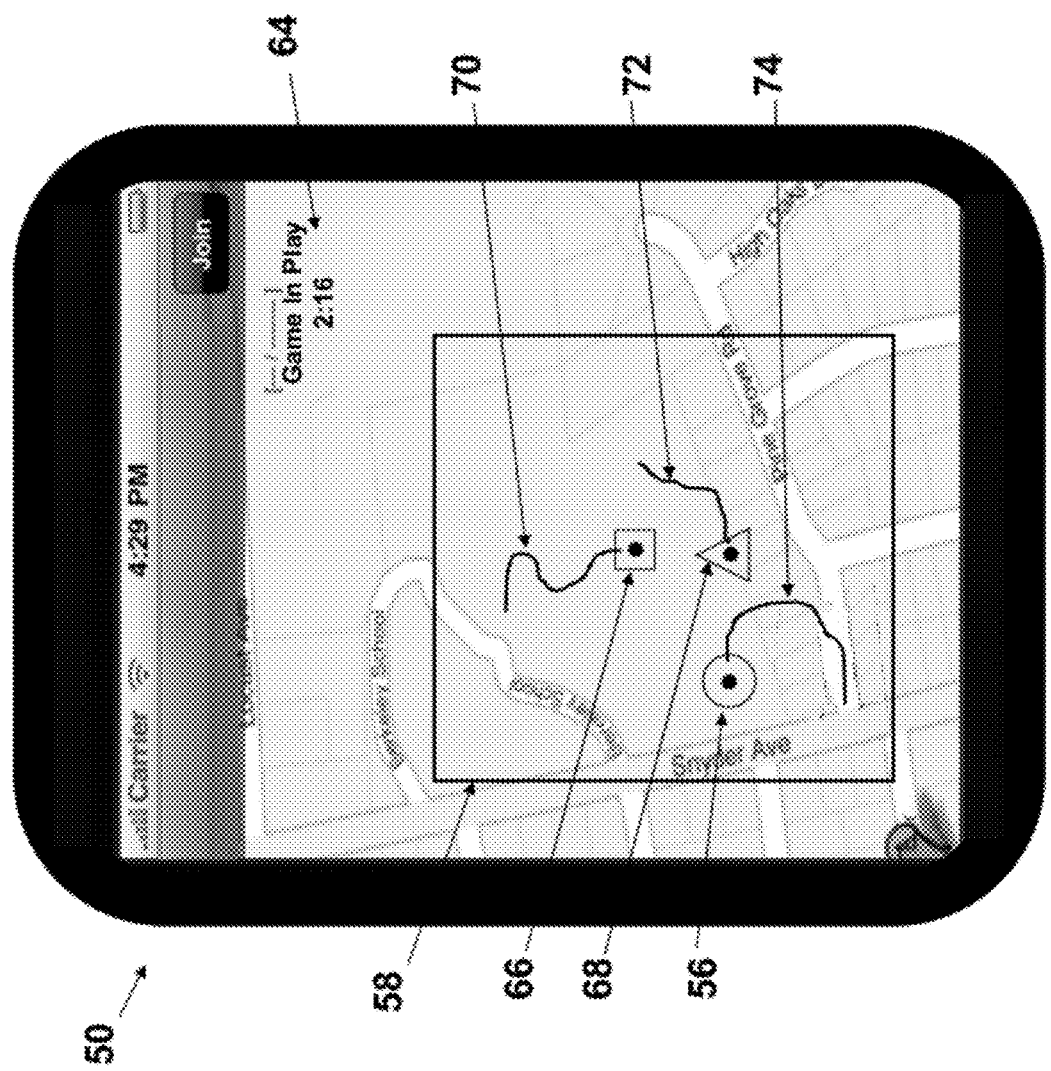
FIG. 12 is an example depiction of players' tails.

FIG. 12 is an example depiction of players' tails. Upon game start, players must be in motion. If a player stops moving, or moves slower than a predetermined speed, the player is expelled from the game. As players move, virtual tails are generated. A player's virtual tail trails a respective player. As depicted in FIG. 12, player 56 has virtual tail 74, player 68 has virtual tail 72, and player 66 has virtual tail 70. In an example embodiment, each WT involved in the game determines the configuration (start point, end point, shape) of its respective virtual tail and geocasts information pertaining to the configuration of its virtual tail. Each other WT involved in the game, receiving the information pertaining to the configuration of another player's virtual tails, renders the configurations of its own and the other virtual tails, as shown in the example depiction of FIG. 12.

A virtual tail can be determined in various ways. In an example embodiment, a virtual tail can begin at the location of a respective player at the start of the game. As the game progresses, and the player moves, the virtual tail is continuously updated, such that the one end point of the virtual tail represents the current location of the respective player and the other end point represents the starting location of the respective player. In this example embodiment, the virtual tail of a player represents the path the player has taken throughout the game. As depicted in FIG. 12, the location of player 56 displayed on WT 50 represents the current location of player 56. The virtual tail 74 extends from the current location of player 56 to the location where player 56 started the game. Similarly, the location of player 68 displayed on WT 50 represents the current location of player 68, and the virtual tail 72 extends from the current location of player 68 to the location where player 68 started the game. And likewise, the location of player 66 displayed on WT 50 represents the current location of player 66. The virtual tail 70 extends from the current location of player 66 to the location where player 66 started the game.

According to example rules of the geogame, if a player stops moving, the player is expelled from the geogame. In an example embodiment, each player must exceed (or maintain) a threshold speed (e.g., 1 mile per hour). If a player does not maintain or exceed the threshold speed, the player is expelled from the geogame. If a player exits the confines of the game play boundary/region, the player is expelled from the geogame. If virtual tails cross, the respective players of the crossed virtual tails are expelled from the geogame. If a player crosses another player's virtual tail, the player who crossed the virtual tail is expelled from the geogame. In an example embodiment, a virtual tail can have a height. The height can be assigned at any appropriate time, such as, for example, at the start of the game. When a player sees that he/she is approaching another player's virtual tail, the player can jump over the virtual tail. If it is determined (e.g., by the player's WT) that the player jumped over the height of the virtual tail, the player will not be expelled from the game. If multiple players are playing the geogame, the last player in the game is the winner. The geogame can be played by a single player. In an example embodiment, a goal of a single player game is to stay within the boundary/region as long as possible without exiting the confines of the boundary and without crossing his/her virtual tail. Individual players could compete for the longest times in a predefined game play boundary/region. The display area 64 indicates that the geogame has been in play for 2 minutes and 16 seconds.

Figure 13:
FIG. 13 is an example depiction of players being expelled from the geogame.

FIG. 13 is an example depiction of players being expelled from the geogame. As depicted in FIG. 13, player 66 was expelled for crossing the tail 72 of player 68. As shown in display area 64, player 66 was expelled 3 minutes and 11 seconds after start of the geogame. Player 68 was expelled 2 minutes and 33 seconds into the geogame for not moving quickly enough. And, player 56 was expelled from the game for leaving the confines of the boundary 3 minutes and 23 seconds into the game. Because player 56 lasted longer than the other players, player 56 is declared the winner. In another example embodiment, once players 66 and 68 were expelled, the game could stop, declaring player 56 the winner.

Expulsion of a player can be rendered in any appropriate manner. For example, the representation of the player could flash, change shape, change color, change intensity, an audio cue could be rendered, an mechanical cue could be rendered, text could be displayed, or the like, or any combination thereof.

In an example embodiment, the location, velocity, and virtual tail configuration of a player are determined by the player's respective WT. Information indicative of each player's location and updated virtual tail location are geocast. Thus, each WT in the geocast region involved in the geogame will receive the geocast of the other players' locations and virtual tail location update. Accordingly, each WT involved in the geogame, in an example embodiment, renders the location of each player and configuration of each respective virtual tail. The location, velocity, and virtual tail configuration of each player are continuously determined during game play. Location, velocity, and virtual tail configuration can be determined at any appropriate time interval. For example, location and velocity can be determined every second, every 5 seconds, or the like. In an example embodiment, location and virtual tail information are geocast throughout game play. Location and virtual tail information can be geocast at any appropriate time interval. Location and virtual tail information can be geocast at the time they are determined, at periodic intervals (e.g., every second, every 5 seconds, etc.), upon request, or any appropriate combination thereof.

FIG. 14, FIG. 15, FIG. 16, and FIG. 17 depict an example flow diagram of a process for multiple player example geogame. It is to be understood that the steps of the processes depicted herein are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. Also, it is to be understood that the depicted processes can be ended at any time.

Figure 14:
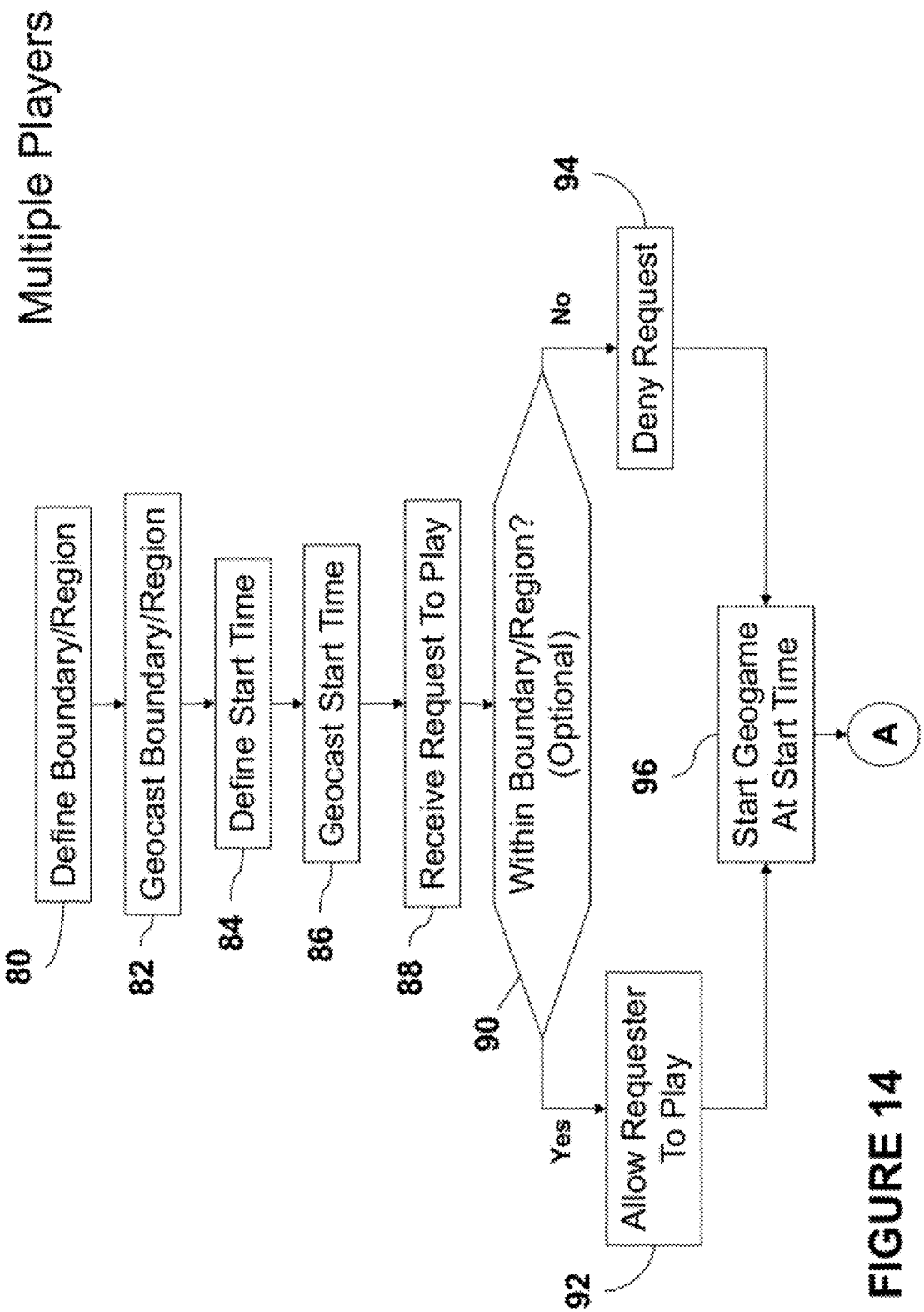
FIG. 14 depicts an example flow diagram of a process for multiple player example geogame.

Referring to FIG. 14, a boundary or region of game play is defined at step 80. The boundary/region can be defined as described above. For example the boundary/region could be defined as two-dimensional boundary/region, a three-dimensional boundary/region, a boundary/region located in multiple physical locations, or the like, or any appropriate combination thereof. The boundary/region is geocast at step 82. The boundary/region is geocast utilizing the aforementioned geocast protocol. The boundary/region can be geocast to a geographic region (to no one in particular), in attempt to find persons interested in playing the geogame. The boundary/region can be geocast to specific geographic regions, to specific individuals, or the like. Upon being geocast, the boundary/region will be available to devices within the geocast region. A start time is defined at step 84. The start time can be in any appropriate format. For example, the start time could be a time of day, a count down timer, or the like. The start time is geocast at step 86. At step 88, a request to play is received. The request to play can be received by any appropriate WT and/or a processor or the like, involved in the geogame. The request to play can be received by multiple WT and/or processors. When a request is received, the geogame application executing on a receiving WT/processor will, if the request is accepted, add the requesting player to the list of players and each WT will appropriately render information (e.g., player location, tail location, player icon, etc.).

In an example embodiment, a requester cannot join the geogame unless the requester is within the boundary/region. At step 90, it is determined if a requester is within the boundary/region. It is to be understood that step 90 is optional. In an example embodiment, a requester cannot join the geogame unless the requester is within the boundary/region. In another example embodiment, a request can join the geogame even if the requester is not within the boundary/region at the time the request is made. Note, that in this embodiment, if the requester/player is not within the boundary/region at game start, the requester/player will be expelled from the geogame.

If, at step 90, it is determined that the requester is within the boundary/region, the requester is allowed, at step 92, to play the geogame. If, at step 90, it is determined that the requester is not within the boundary/region, the request is denied at step 94. The geogame is started at step 96.

In another example embodiment, a requester can join the geogame even if the requester is not within the boundary/region at the time the request is made. Note, that in this embodiment, if the requester/player is not within the boundary/region at game start, the requester/player will be expelled from the geogame. Also, in this embodiment, the process depicted in FIG. 14 proceeds directly from step 88 to step 96.

Figure 15:
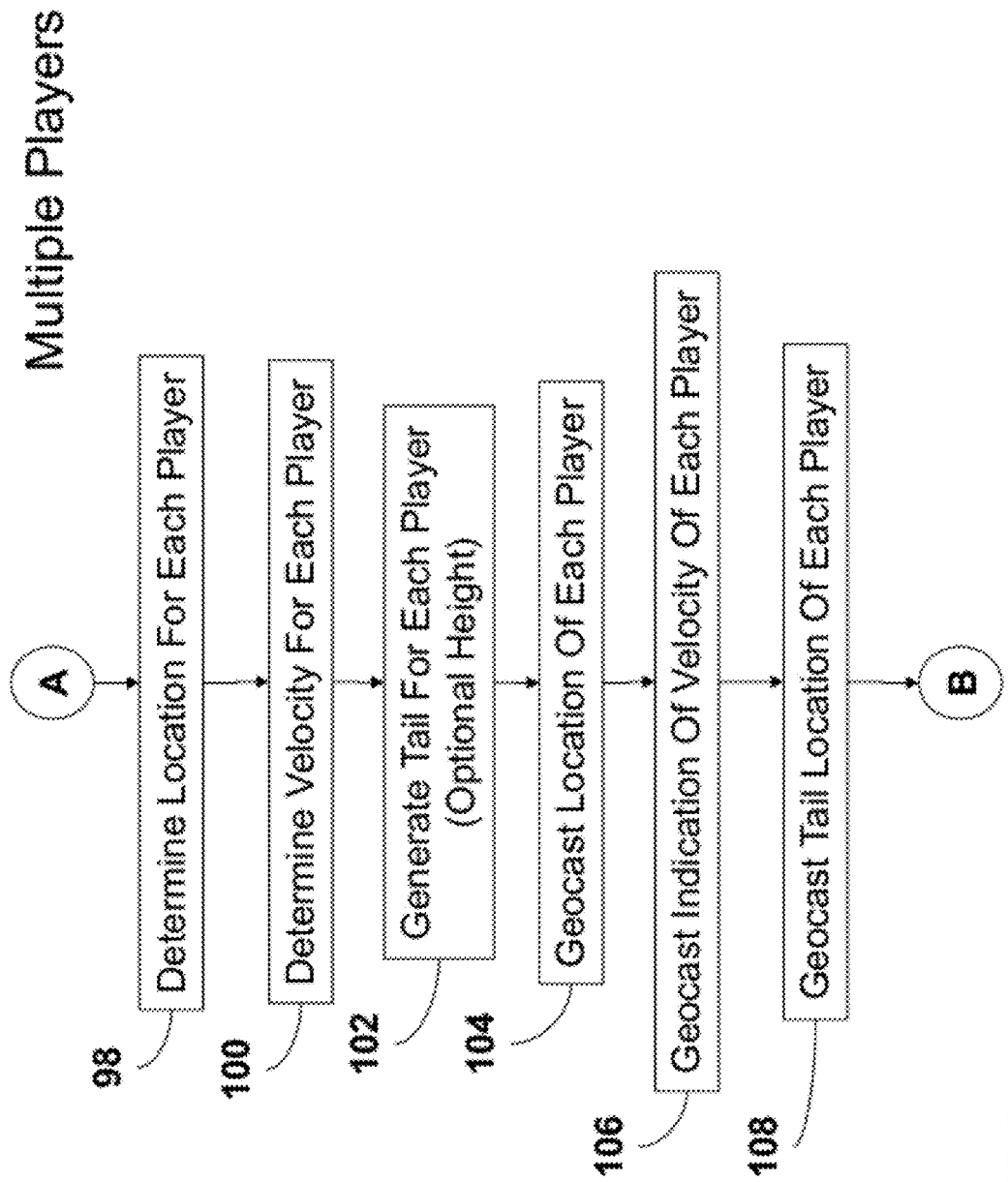
FIG. 15 is a continuation of the example flow diagram of a process for multiple player example geogame.

Continuing to FIG. 15, at step 98, the location of each player is determined. The velocity of each player is determined at step 100. A tail is generated for each player at step 102. In an example embodiment, a tail height can be defined. The location of each player is geocast at step 104. An indication of the velocity of each player is geocast at step 106. For example, a value indicative of the actual velocity of a player can be geocast, an indication that the velocity is zero can be geocast, an indication that the velocity is not zero can be geocast, an indication that the velocity is above, equal to, or below a threshold value can be geocast, or any appropriate combination thereof. The location of each tail is geocast at step 108. It is repeated that the order of the steps depicted herein is exemplary. Steps may be performed in any appropriate order, and not only in the order depicted in the figures herein.

Figure 16:
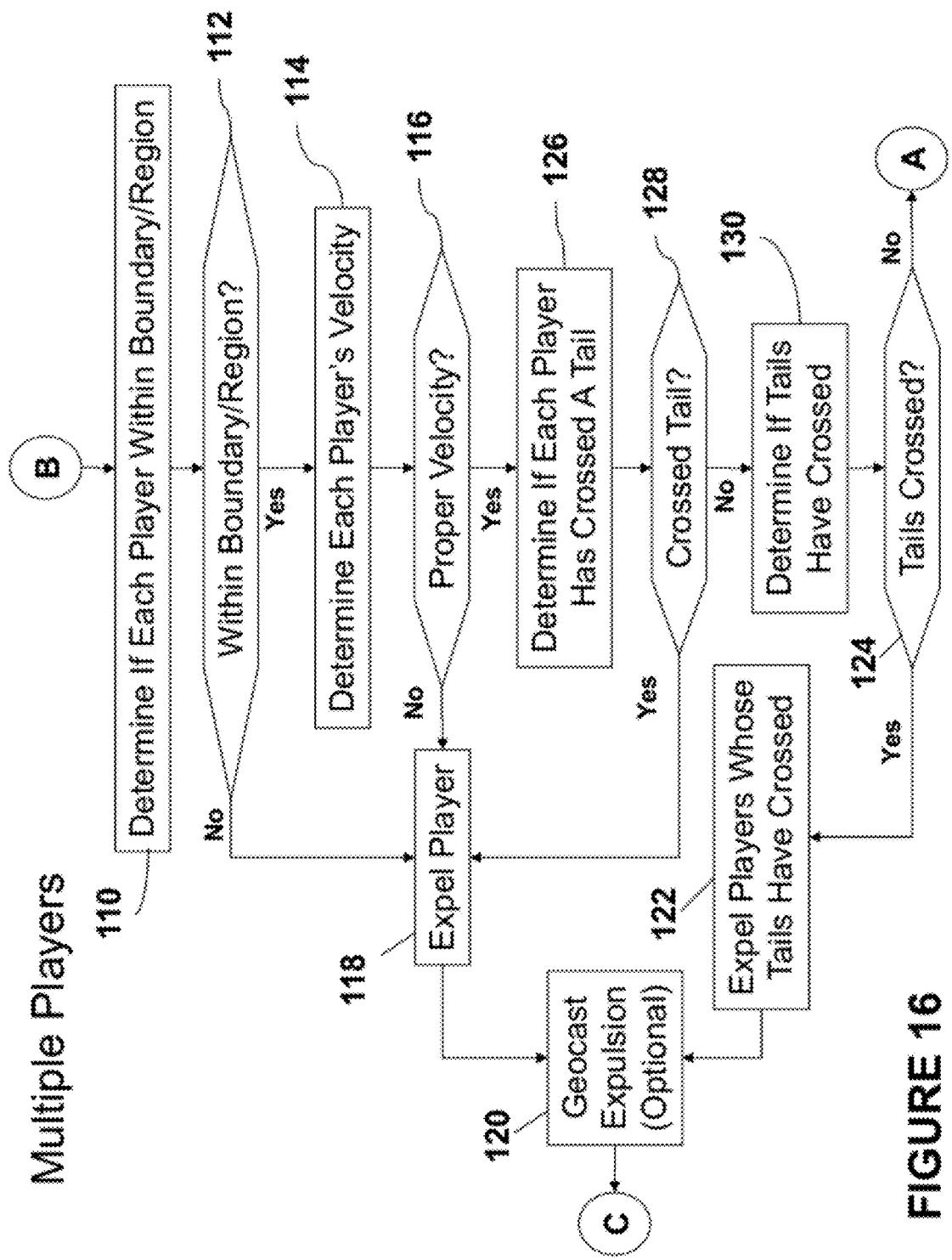
FIG. 16 is a continuation of the example flow diagram of a process for multiple player example geogame.

Continuing to FIG. 16, at step 110, it is determined if each player is within the geogame boundary/region. If, at step 112, it is determined that a player is not within the geogame boundary/region, the player is expelled at step 118. An indication of the expulsion optionally can be geocast at step 120. The indication of expulsion can be any appropriate indication of expulsion allowing for other WTs and other players to be notified that a player has been expelled. The indication of the expulsion can include a time of expulsion, total time player has been playing, why a player was expelled, or the like, or any appropriate combination thereof.

If, at step 112, it is determined that a player is within the geogame boundary/region, each player's velocity is determined, at step 114. At step 116, it is determined if each player's velocity is proper. For example, a player's velocity could be proper it is greater than zero, a player's velocity could be proper if it is equal to or greater than a threshold value of velocity, or a player's velocity could be proper if it is greater than a threshold value of velocity. If it is determined, at step 116, that a player's velocity is not proper, the process proceeds to step 118 for that player, and continues therefrom as previously described.

If it is determined, at step 116, that a player's velocity is proper, it is determined, at step 126, if a player has crossed another player's tail or his/her own tail. If it is determined, at step 128, that a player has crossed another player's tail or his/her own tail, the process proceeds to step 118 for that player, and continues therefrom as previously described. If it is determined, at step 128, that a player has not crossed a tail, it is determined if tails have crossed at step 130. If a tail height has been defined, in an example embodiment of the geogame, a player can jump over the tail. Thus, just before a player sees that he/she is about to cross a tail, the player can physically jump. If the player jumps at least as high as the tail height, the player is determined to have jumped over the tail, and will be considered to not have crossed the tail. If it is determined, at step 124, that no tails have crossed, the process proceeds to step 98 and continues therefrom as previously described. If it is determined, at step 124, that tails have crossed, the players whose tails have crossed are expelled from the geogame at step 122. An indication of the expulsion of the players is geocast at step 120. The indication of expulsion can be any appropriate indication of expulsion allowing for other WTs and other players to be notified that a player has been expelled.

Figure 17:
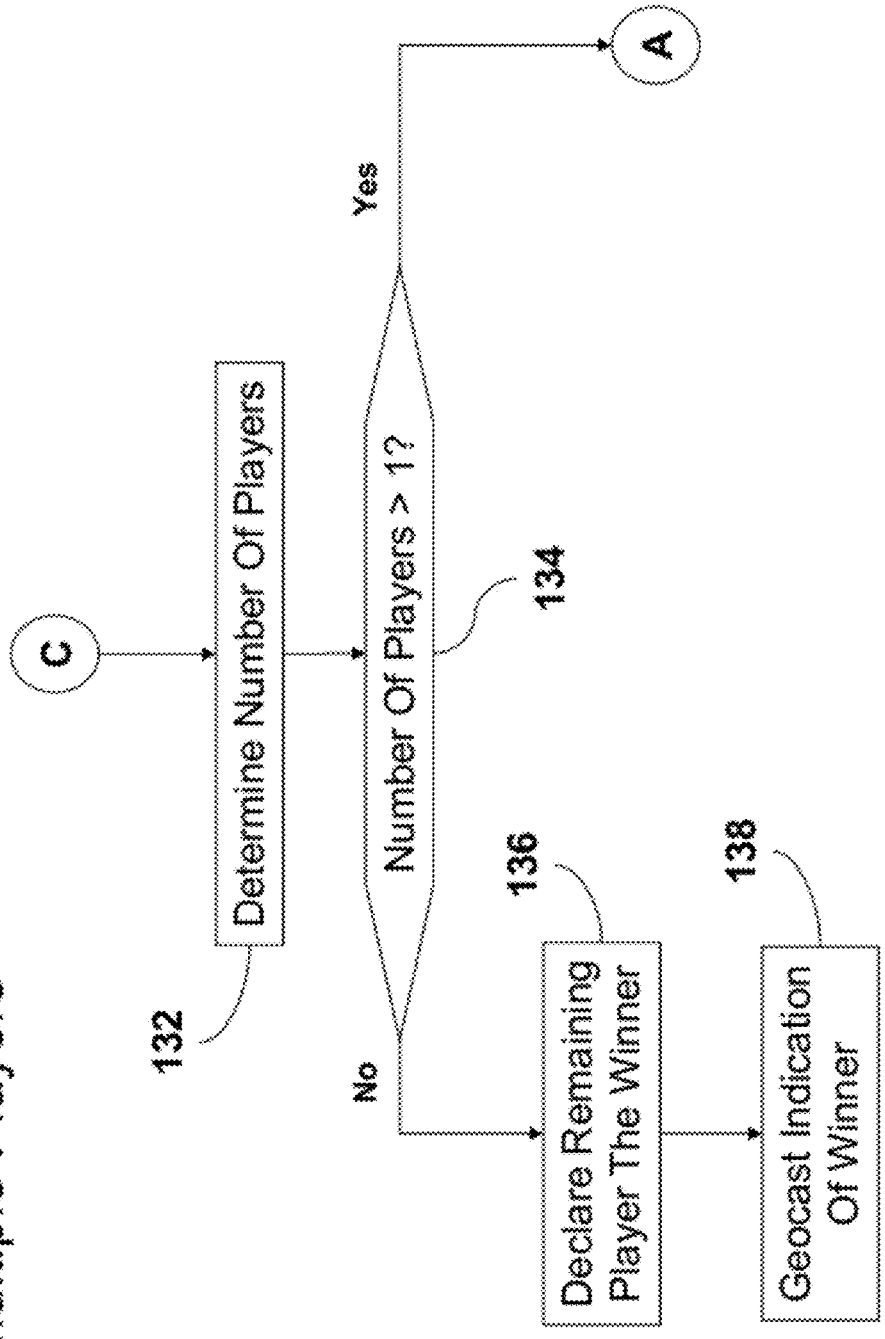
FIG. 17 is a continuation of the example flow diagram of a process for multiple player example geogame.

From step 120, the process proceeds to step 132 of FIG. 17. The number of remaining players is determined at step 132. If it is determined, at step 134, that the number of players is greater than 1, the process proceeds to step 98 and continues therefrom as previously described. If it is determined, at step 134, that the number of players is not greater than 1 (i.e., equals 1), the remaining player is declared the winner at step 136. And, optionally, an indication of the winner is geocast at step 138.

Figure 18:
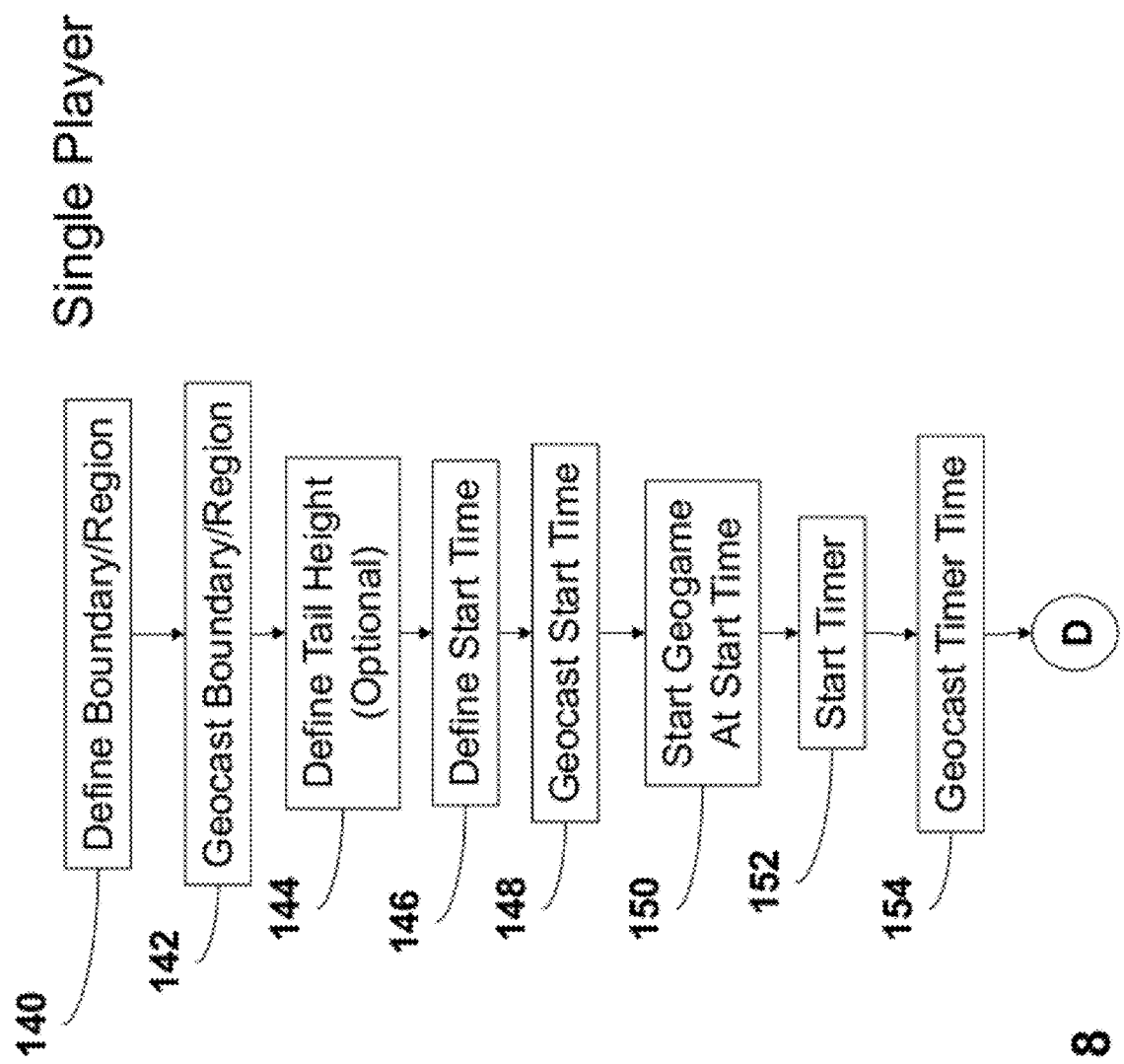
FIG. 18 depicts an example flow diagram of a process for single player example geogame.
Figure 19:
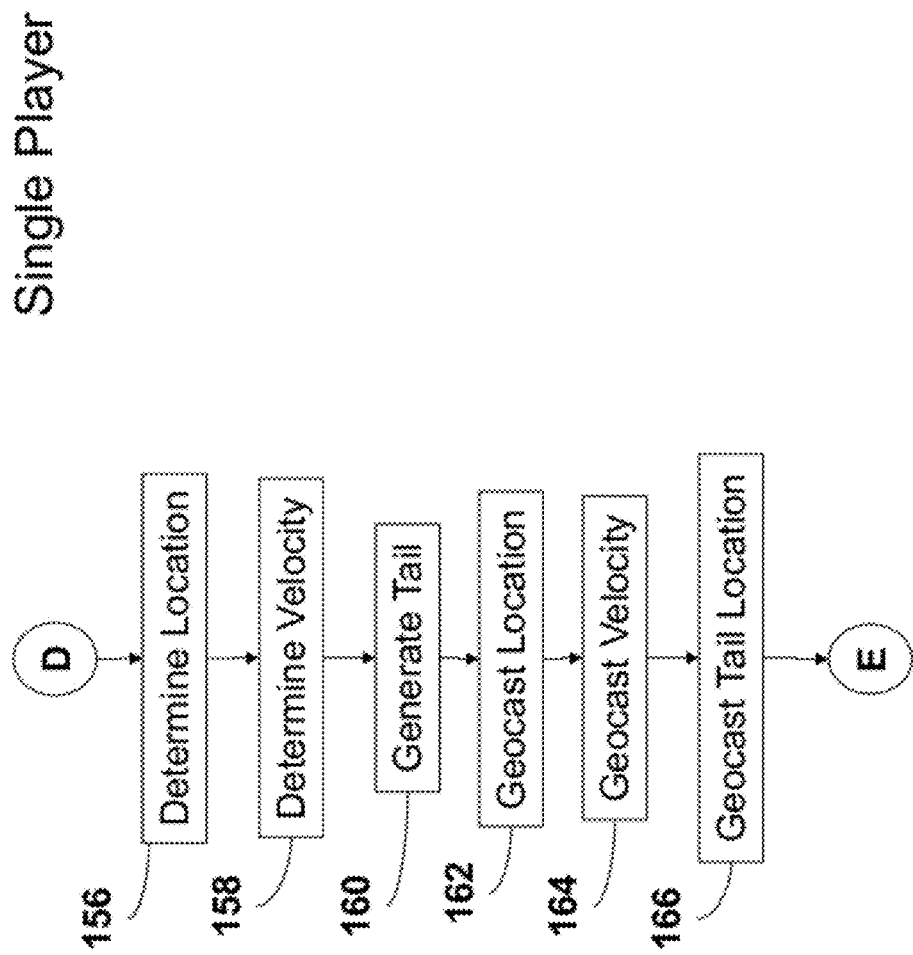
FIG. 19 is a continuation of the example flow diagram of a process for single player example geogame.
Figure 20:
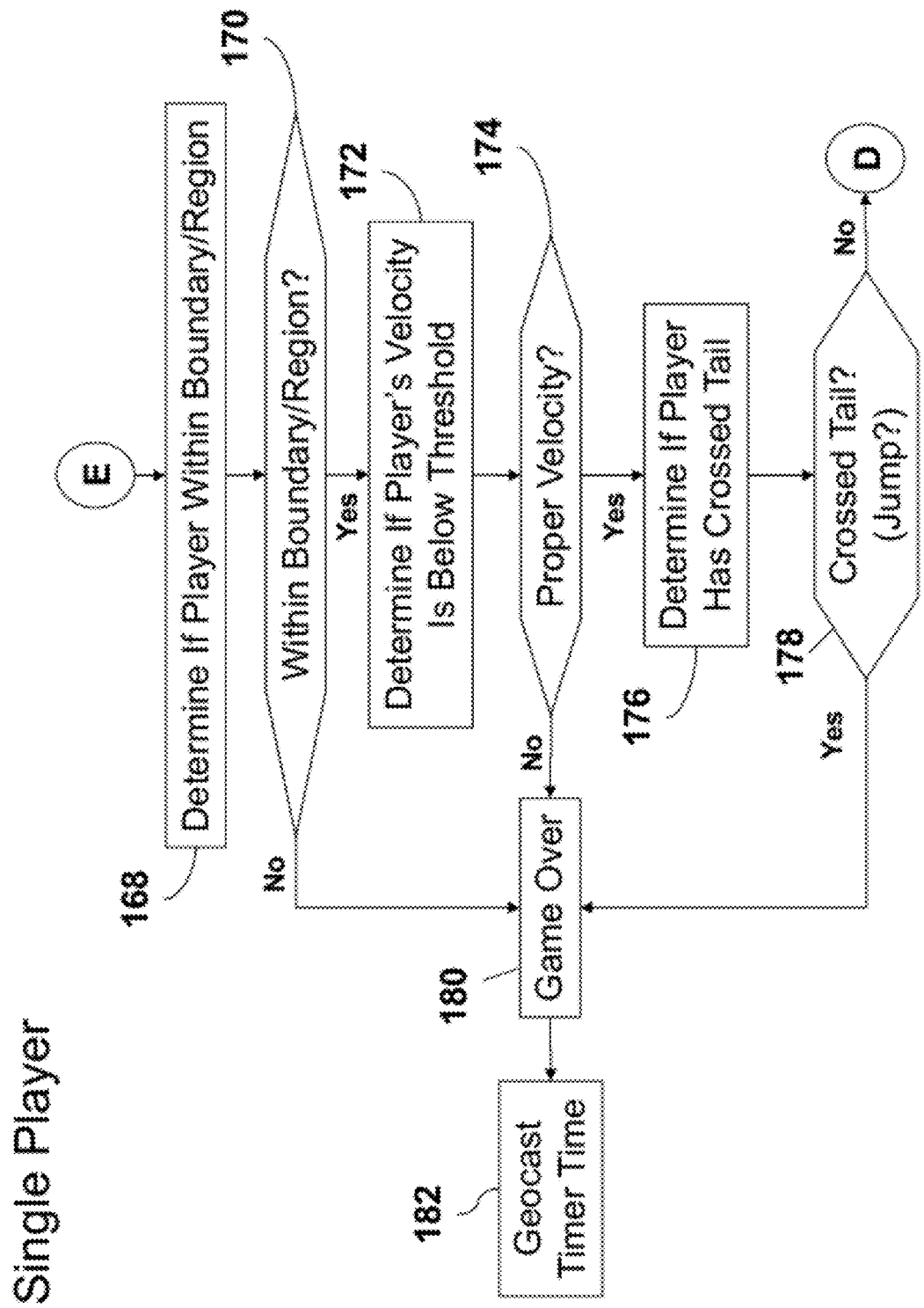
FIG. 20 is a continuation of the example flow diagram of a process for single player example geogame.

FIG. 18, FIG. 19, and FIG. 20 depict an example flow diagram of a process of a single player example geogame. It is to be understood that the steps of the processes depicted herein are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. Also, it is to be understood that the depicted processes can be ended at any time.

In the single player geogame described herein, information may be geocast to allow others to monitor the performance of the player playing the geogame. Information may be geocast to allow recording of game play.

Referring to FIG. 18, a boundary or region of game play is defined at step 140. The boundary/region can be defined as described above. The boundary/region is geocast at step 142. The boundary/region is geocast utilizing the aforementioned geocast protocol. A tail height is optionally defined at step 144. A start time is defined at step 146. The start time is geocast at step 148. The geogame is started at step 150. A timer is started at step 152. The timer time is geocast at step 154.

Continuing to FIG. 19, at step 156, the location of the player is determined. The velocity of the player is determined at step 158. A tail is generated for the player at step 160. In an example embodiment, a tail height can be defined. The location of the player is geocast at step 162. An indication of the velocity of the player is geocast at step 164. For example, a value indicative of the actual velocity of the player can be geocast, an indication that the velocity is zero can be geocast, an indication that the velocity is not zero can be geocast, an indication that the velocity is above, equal to, or below a threshold value can be geocast, or any appropriate combination thereof. The location of the player's tail is geocast at step 166. It is repeated that the order of the steps depicted herein is exemplary. Steps may be performed in any appropriate order, and not only in the order depicted in the figures herein.

Continuing to FIG. 20, at step 168, it is determined if the player is within the geogame boundary/region. If, at step 170, it is determined that the player is not within the geogame boundary/region, the player is expelled, and thus the game is over, at step 180. An indication of the expulsion/game over is geocast at step 182. The indication of expulsion can be any appropriate indication of expulsion allowing for other WTs and other players to be notified that a player has been expelled. The indication of the expulsion can include a time of expulsion, total time player has been playing (e.g., timer time), or the like, or any appropriate combination thereof.

If, at step 170, it is determined that the player is within the geogame boundary/region, the player's velocity is determined, at step 172. At step 174, it is determined if the player's velocity is proper as previously described. For example, the player's velocity could be proper it is greater than zero, the player's velocity could be proper if it is equal to or greater than a threshold value of velocity, or the player's velocity could be proper if it is greater than a threshold value of velocity. If it is determined, at step 174, that the player's velocity is not proper, the process proceeds to step 184, and continues therefrom as previously described.

If it is determined, at step 174, that the player's velocity is proper, it is determined, at step 176, if the player has crossed his/her tail. If it is determined, at step 178, that the player has crossed his/her tail, the process proceeds to step 180 and continues therefrom as previously described. If it is determined, at step 178, that a player has not crossed a tail, the process proceeds to step 156 and continues therefrom as previously described. If a tail height has been defined, in an example embodiment of the geogame, the player can jump over the tail. Thus, just before the player sees that he/she is about to cross his/her tail, the player can physically jump. If the player jumps at least as high as the tail height, the player is determined to have jumped over the tail, and will be considered to not have crossed the tail.

Figure 21:
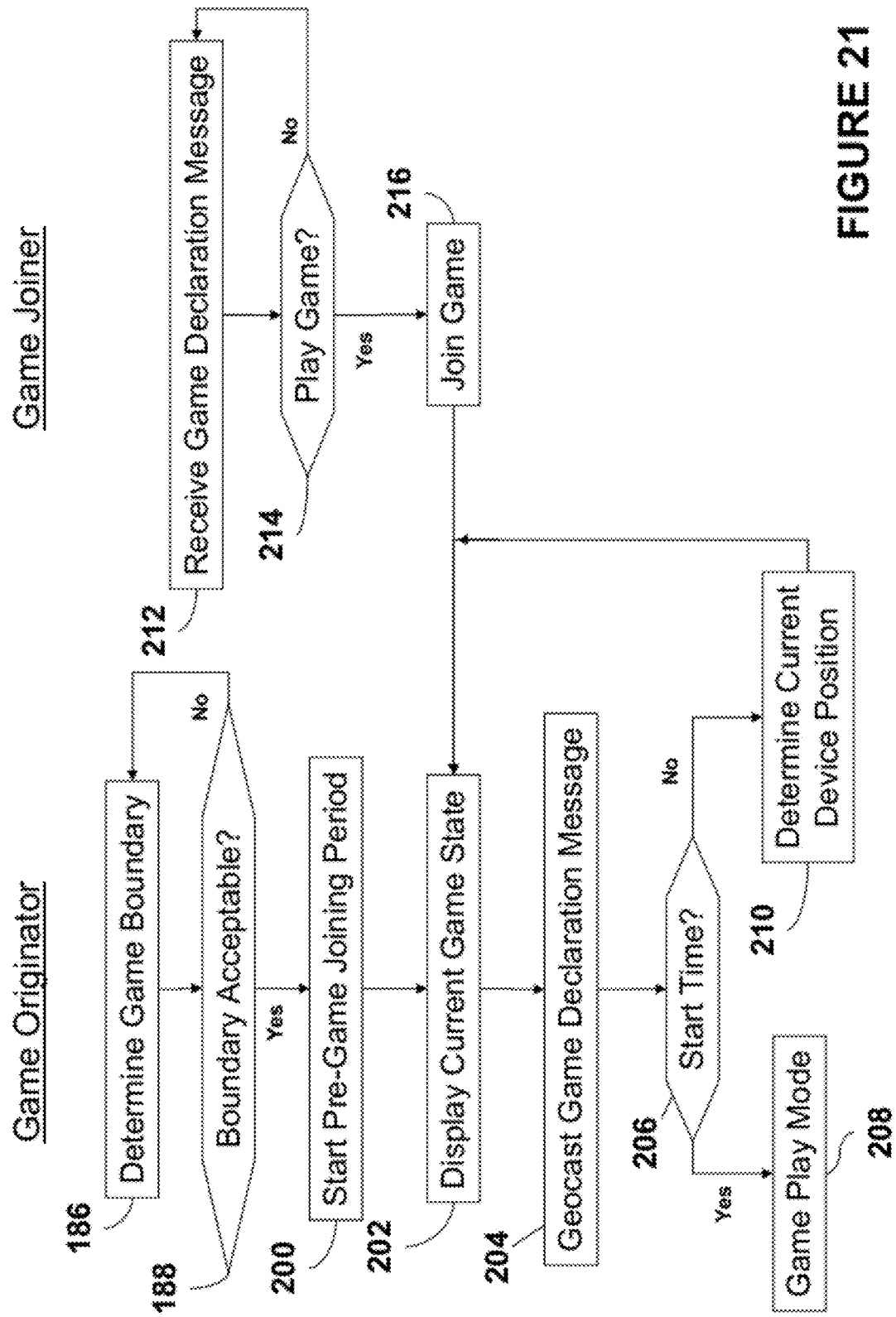
FIG. 21 is a flow diagram of an example process for originating and joining a geogame.
Figure 22:
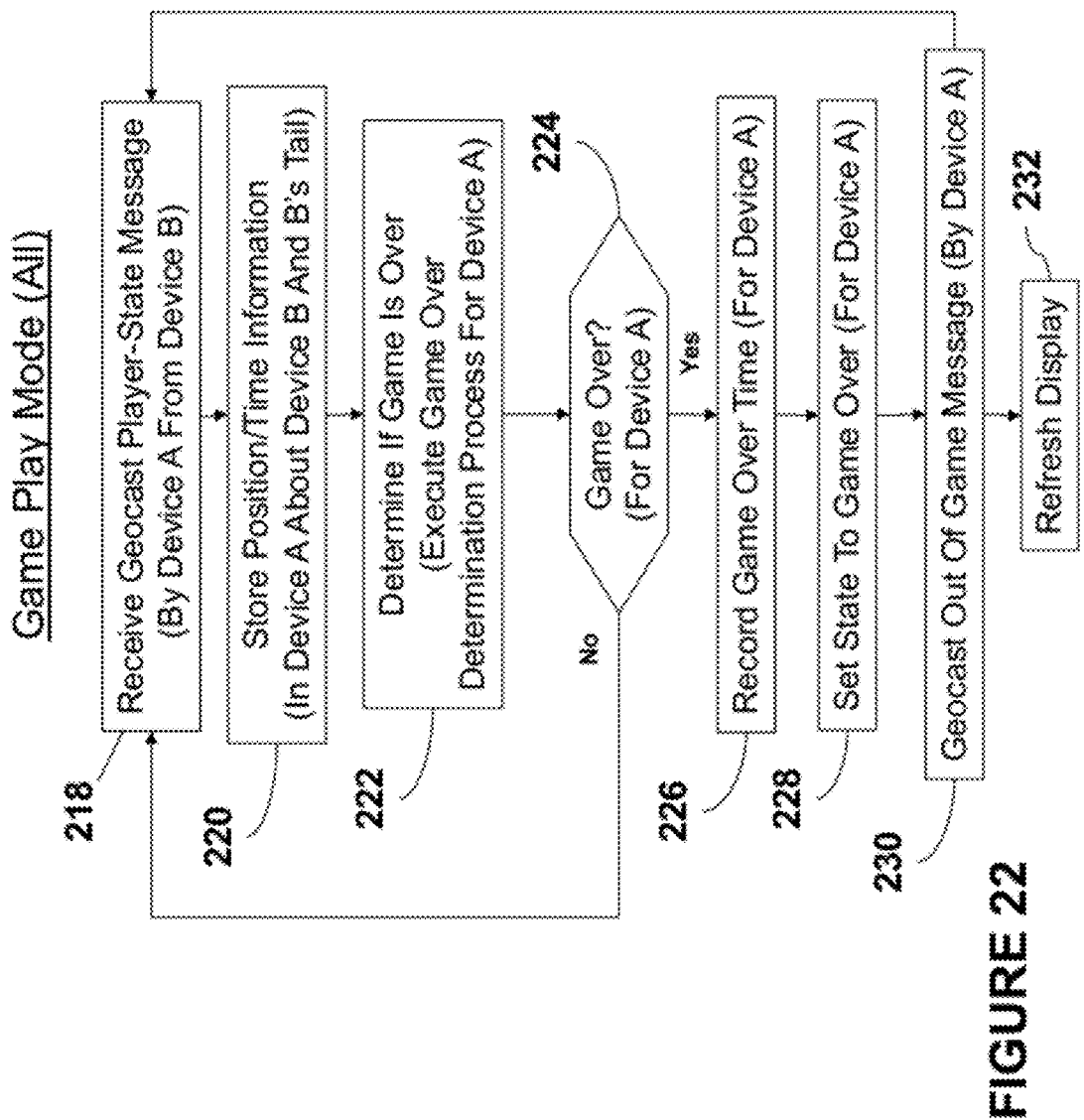
FIG. 22 is a flow diagram of an example game play mode.
Figure 23:
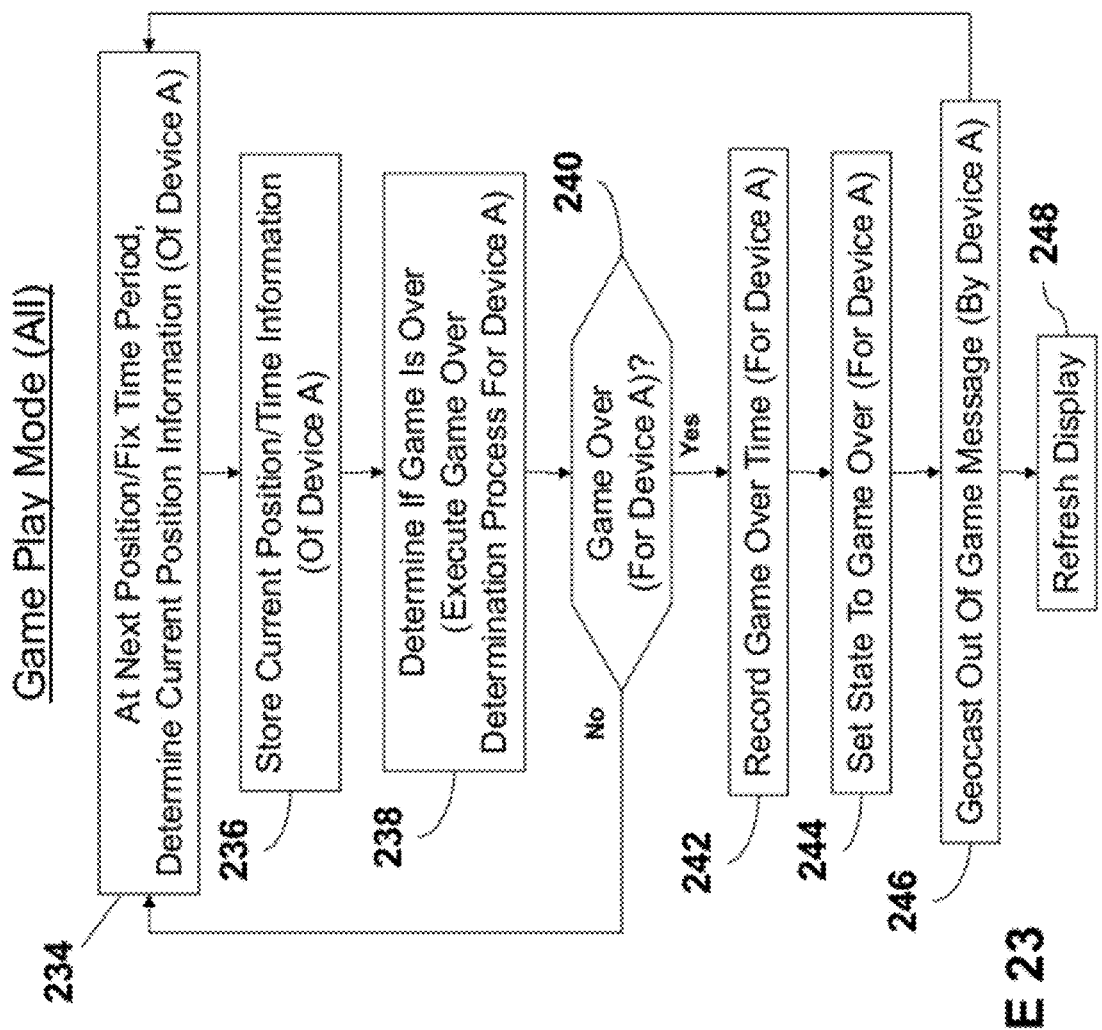
FIG. 23 is a flow diagram of another example game play mode.

FIG. 21, FIG. 22, and FIG. 23 depict another example flow diagram of a process of playing a geogame. It is to be understood that the steps of the processes depicted herein are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. Also, it is to be understood that the depicted processes can be ended at any time.

Referring to FIG. 21, is a flow diagram of an example process for originating and joining a geogame, at step 186, a game boundary is determined by the game originator. At step 188, it is determined if the boundary is acceptable. If the boundary is not acceptable, the process proceeds to step 186. If the boundary is acceptable, the pre-game joining time period begins. In an example embodiment, the originator can tap "join", or the like, on his/her device to start the pre-game joining period. At step 200, the originating device displays the current game state, including for example, game boundary, active game player positions, and/or countdown to start time. At step 202, the originating device geocasts a game declaration message. In an example embodiment, the geocast declaration message includes the game boundary, the game start time, and/or player locations. It is determined if the start time is reached at step 206. If start time has been reached, game play mode begins at step 208. If start time has not been reached, the current position of the device is determined at step 210, the process proceed therefrom to step 202.

At step 212, a device of a user potentially able to join the game, receives the geocast game declaration message. At step 214, the user decides whether to play the game. If the user decides to play the game, the user joins the game at step 216. In an example embodiment, the user joins the gap by tapping "join" or the like on his/her device. If the user decides not to join the game (step 214), the process proceeds to step 212.

FIG. 22 is a flow diagram of an example game play mode. FIG. 22 is described herein, for the sake of clarity, with respect to two devices: A and B. It is to be understood however, that the process depicted in FIG. 22 is applicable to any two devices. At step 218, a device receives a geocast player-state message. In an example embodiment, the geocast player-state message includes <position, time> pairs form device B describing the position and structure of the tail of B, information pertaining to the game state of B (e.g., game over for B, game not over for B), or the like. At step 220, information form the geocast player-state message is stored. In an example embodiment, information is stored in device A about device B's state and tail information (e.g., position, time> pairs).

At step 222, it is determined if the game is over for device A. The game can be determined to be over in any appropriate manner. For example, the process depicted in FIG. 26 can be utilized to determine if a game is over (See the herein description of FIG. 26 for more detail). If it is determined that the game is not over (at step 224), the process proceeds to step 218. If it is determined that the game is over (at step 224), the game over time and/or time of game play, is recorded at step 226. In an example embodiment, the game over time and/or time of game play is recorded in device A. The game state of the device (e.g., device A) is set to game over at step 228. At step 230, an out of game message is geocast by device A. The display of device A is refreshed at step 232.

FIG. 23 is a flow diagram of another example embodiment of the game play mode. FIG. 23 is described herein, for the sake of clarity, with respect to two devices: A and B. At step

234, at the next position/fix time the position of device A is determined. The position is stored in the device at step 236. At step 238, it is determined if the game is over for device A. The game can be determined to be over in any appropriate manner. For example, the process depicted in FIG. 26 can be utilized to determine if a game is over (See the herein description of FIG. 26 for more detail). If it is determined that the game is not over (at step 240), the process proceeds to step 234. If it is determined that the game is over (at step 240), the game over time and/or time of game play, is recorded at step 242. In an example embodiment, the game over time and/or time of game play is recorded in device A. In an example embodiment, a player's position and time are recorded in a data structure representing the player's own position and tail. The game state of the device (e.g., device A) is set to game over at step 244. At step 246, an out of game message is geocast by device A. The display of device A is refreshed at step 248.

Figure 24:
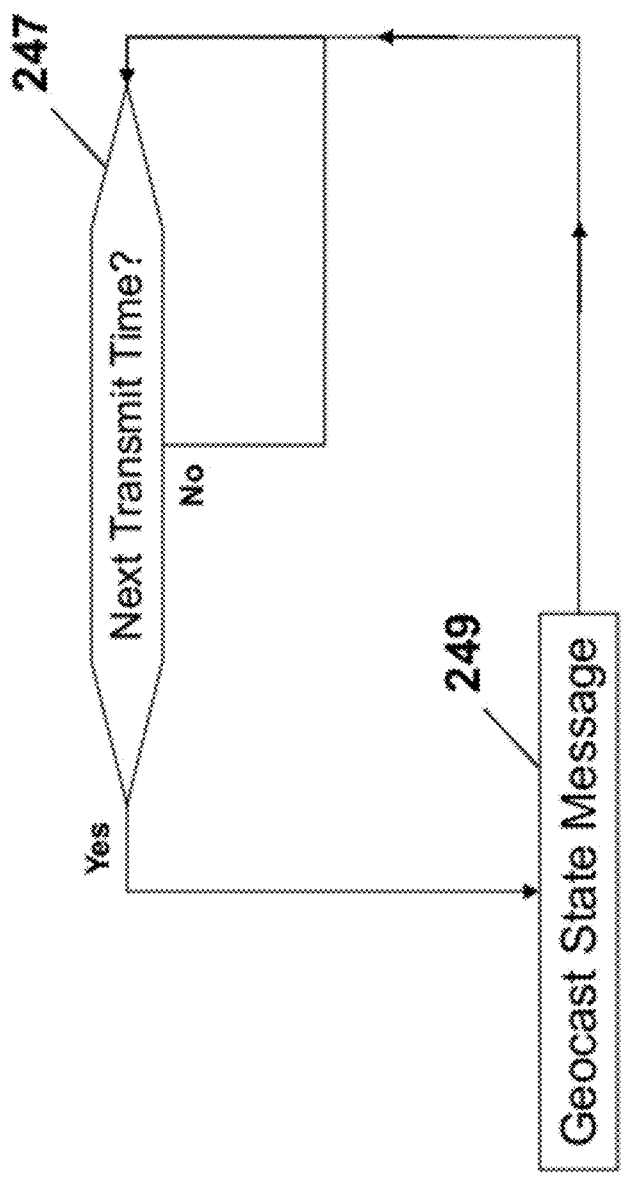
FIG. 24 is a flow diagram of a process for proving state information.

FIG. 24 is a flow diagram of an example process for providing state information. The process depicted in FIG. 24 can be running currently with the processes depicted in FIG. 22 and FIG. 23. At step 247, it can be determined if it is time to transmit (geocast) state information. This can be determined by any appropriate device. State information can be geocast at any appropriate time in triggered by any appropriate event. For example, state information can be provided at periodic times interval, aperiodic time intervals, triggered by an event (e.g., expulsion of a game player, crossing a tail, etc.), or any appropriate combination thereof. The state information can comprise any appropriate state information as described herein. If it is determined, at step 247, to provided state information, state information can be geocast at step 249. From step 249 the process proceeds to step 247 and continues therefrom. If it is determined, at step 247, that state information is not to be provided, the process proceeds to step 247 and continues therefrom.

Figure 25:
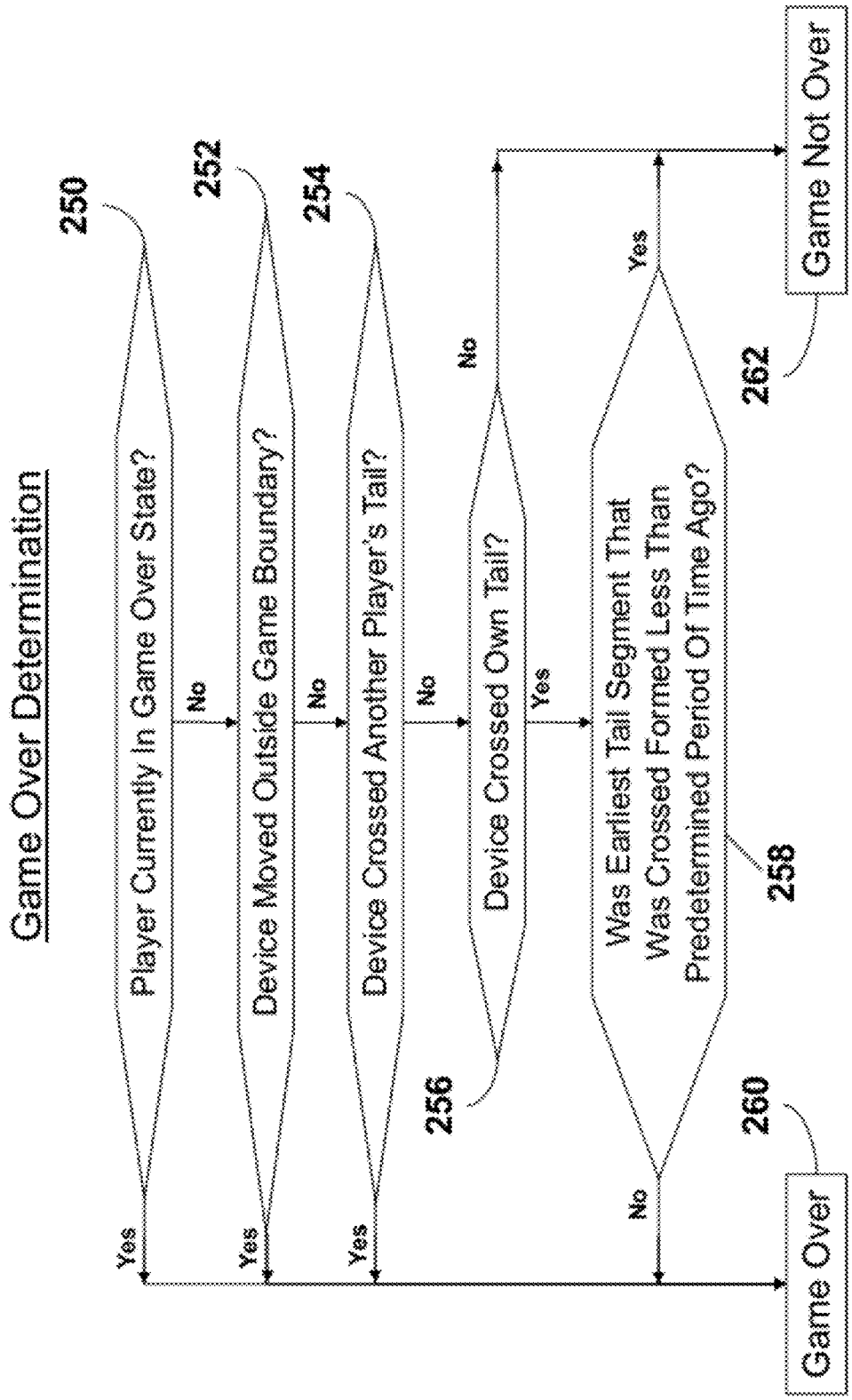
FIG. 25 is a flow diagram of an example process for determining if a game is over.

FIG. 25 is a flow diagram of an example process for determining if a game is over. At step 250, it is determined if a player is currently in the game over state. If the player is in the game over state, the game is over at step 260. If the player is not in the game over state, it is determined at step 252 if the device has moved outside the game boundary. If it is determined that the device has moved outside the game boundary, the game is over at step 260. If it is determined that the device has not moved outside the game boundary, it is determined at step 254, if the device has crossed its own tail. If it is determined that the device has not crossed its own tail, the game is not over as depicted at step 262. If it is determined that the device has crossed its own tail, it is determined at step 258 if the time associated with the formation of the tail segment that was crossed was less than a predetermined period of time (e.g., k seconds). If it is determined that the device has crossed a tail segment of its own tail that was formed less than a predetermined period of time ago, the game is not over as depicted at step 262. If it is determined that the device has not crossed a tail segment of its own tail that was formed less than a predetermined period of time ago, the game is over at step 260. Regarding step 258, it is possible that position measurements may be inaccurate. It is possible, for example, for a position sensor to falsely indicate that a player moved backward or sideways by a small amount. This could result in an improper determination that a player has crossed his/her own tail. According, by ignoring a predetermined number of most recent tail segment or predetermined amount of time (e.g., 2 segments, 5 segments, 5 seconds, 10 seconds), the player is given the opportunity to move far enough away from a previous tail segments such that the position sensing inaccuracy is smaller than the distance moved.

Figure 26:
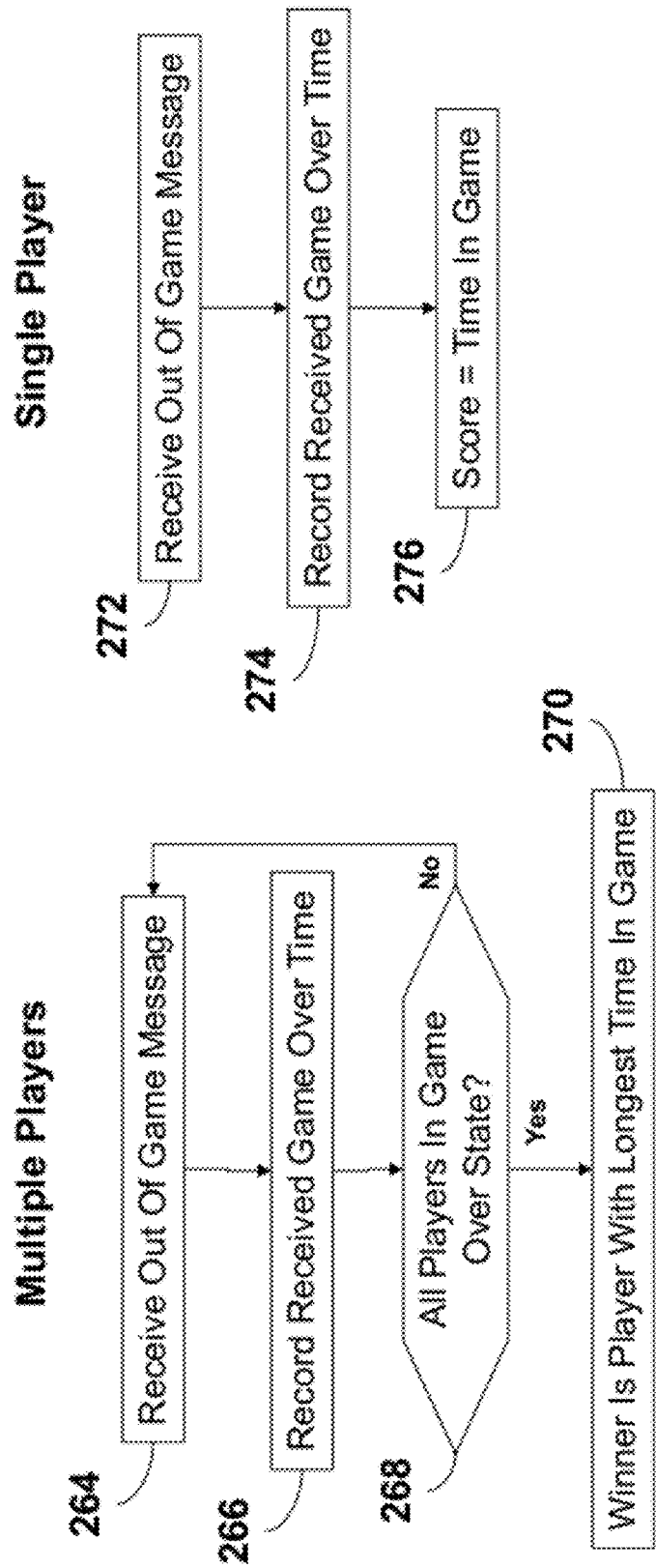
FIG. 26 is a flow diagram of an example process for scoring and winning a multiplayer game and a single player game.

FIG. 26 is a flow diagram of an example process for scoring and winning a multiplayer game and a single player game. At step 262, a game scorer, which can be any appropriate device and/or player, receives an out of game message. If the out of game message is received by other than the game scorer, the out of game message is received via a geocast from another device. If the out of game message is received by the game scorer, the out of game message can be received via its own geocast, or can be received via any appropriate mechanism internal to the game scorer device. At step 266, the game over time received via the out of game message is stored. In an example embodiment, the game over time is stored in the scorer device. If all players are out of the game, as determined at step 268, the player with the longest time in the game is the winner as depicted at step 270. If all players are not out of the game, as determined at step 268, the process proceeds to step 264.

At step 272, a game scorer, which can be any appropriate device and/or player, receives an out of game message form the single player of a geogame. If the out of game message is received by other than the game scorer, the out of game message is received via a geocast from another device. If the out of game message is received by the game scorer, the out of game message can be received via its own geocast, or can be received via any appropriate mechanism internal to the game scorer device. At step 274, the game over time received via the out of game message is stored. In an example embodiment, the game over time is stored in the scorer device. At step 276, the score of the game is determined to be single player's time in the game.

Figure 27:
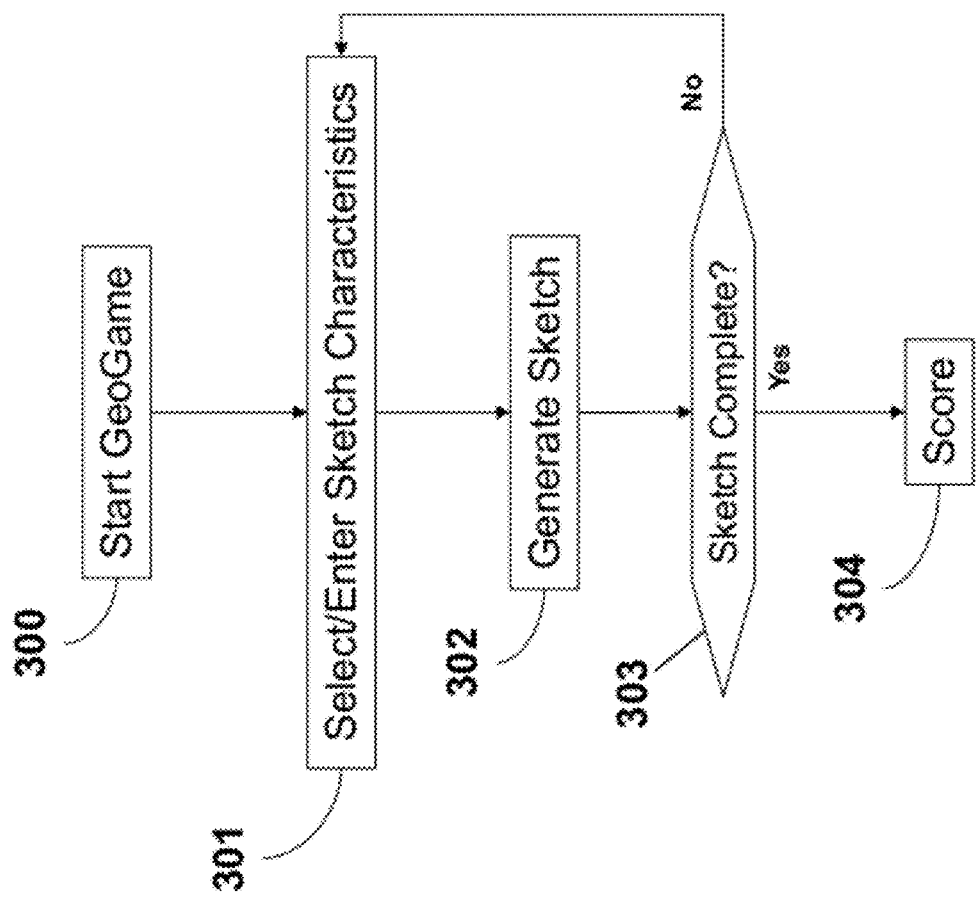
FIG. 27 is a flow diagram of an example process for generating a sketch via a geogame.

FIG. 27 is a flow diagram of an example process for generating a sketch via a geogame. The geogame can be started at step 300. The geogame can be started as described above. At step 301, characteristics of the sketch can be determined and entered/selected. Any appropriate sketch characteristics can be entered and/or selected. Example sketch characteristics can include object to be sketched, color, line style, line thickness, graphic elements, etc. At step 302, a sketch can be generated. Players can generate sketches with their respective virtual tails. Sketches may be generated by individual game players and/or by a group of game players. Sketching can be competitive. At step 303, it can be determined if the sketch is complete. If, at step 303, it is determined that the sketch is complete, at step sketching can be scored (step 304) based on creativeness, accuracy, and/or time to completion. Sketching can be cooperative, wherein groups of players can work together to sketch figures in the virtual world. Is, at step 303, it is determined that the sketch is not complete, the process can proceed to step 301 to continue sketching. A sketch can comprise any appropriate figure, drawing, image, shape, or the like, or any combination thereof. In an example embodiment, players may move through boundaries and tails without penalty. In an example embodiment, players of a group of players can choose a tail color. Thus, the movements of the players of the group can be coordinated, and executed in the real world, to generate a sketch that contains color. The sketch can be rendered (e.g., visually displayed) on the display of each mobile device.

Figure 28:
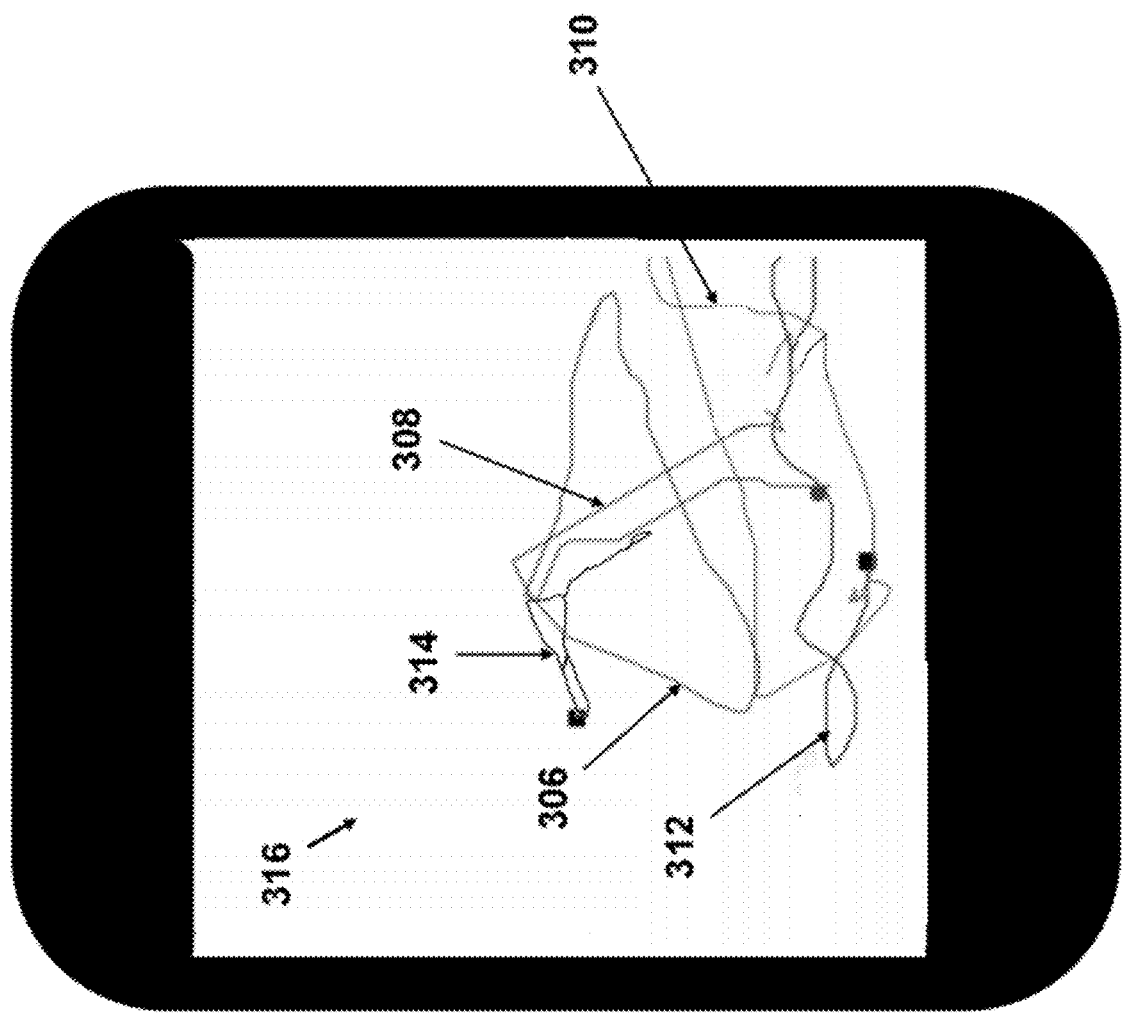
FIG. 28 is an example illustration of a sail boat generated via a geogame and displayed on a mobile device.
Figure 29:
FIG. 29 is another example illustration of a sail boat generated via a geogame and displayed on a mobile device.

FIG. 28 is an example illustration of an object, a sail boat, generated via a geogame and displayed on a mobile device. As depicted in FIG. 28, the sailboat 316 comprises the sail 306, the mast 308, the hull 310, water 312, and a flag 314. One player of the group was assigned a color (red) to draw the sail 306 and the mast 308. Another player of the group was assigned another color (brown) to draw the hull 310. A third player was assigned yet another color (blue) to draw the water 312. And, a fourth player was assigned a color (yellow) to draw the flag 314. As players move to draw the sketch, players can observe the sketch being drawn in the real world as it is evolving. The evolving sketch can be visually rendered in any appropriate manner. For example, an evolving sketch can be displayed on a display of a mobile device over a blank synthetic map as depicted in FIG. 28, over a photorealistic satellite image as shown by sailboat 316 in FIG. 29, or any appropriate combination thereof.

In an example embodiment, the artistic focus of the sketch could be entirely on the figure itself. In other example embodiments, (a) the drawing itself could require gymnastic athleticism, and (b) the real world features shown in the image background could be conceived as part of the artistic statement, with drawn figures integrated appropriately. Geogame embodiments involving sketches could be played non-competitively, or it could be a judged competition among teams. In an example embodiment, a geogame involving sketches could be a timed, such teams compete to plan and draw a given shape, figure, sketch, etc. in the shortest amount of time (fastest). Judging the winner could involve both best time and an artistic assessment of whether a team successfully drew the shape, figure, sketch, etc. Objective measures such as, for example, completion time and image feature counts could be combined with subjective measures based on, for example, judgment of artistry and style using, for example, point systems similar to those used in gymnastics or figure skating. In various embodiments, geogames involving sketches could be combined with combined with intense and/or parkour-style variants, as described herein. For example, style points could be awarded for creative and/or skilled handling of terrain features.

Figure 30:
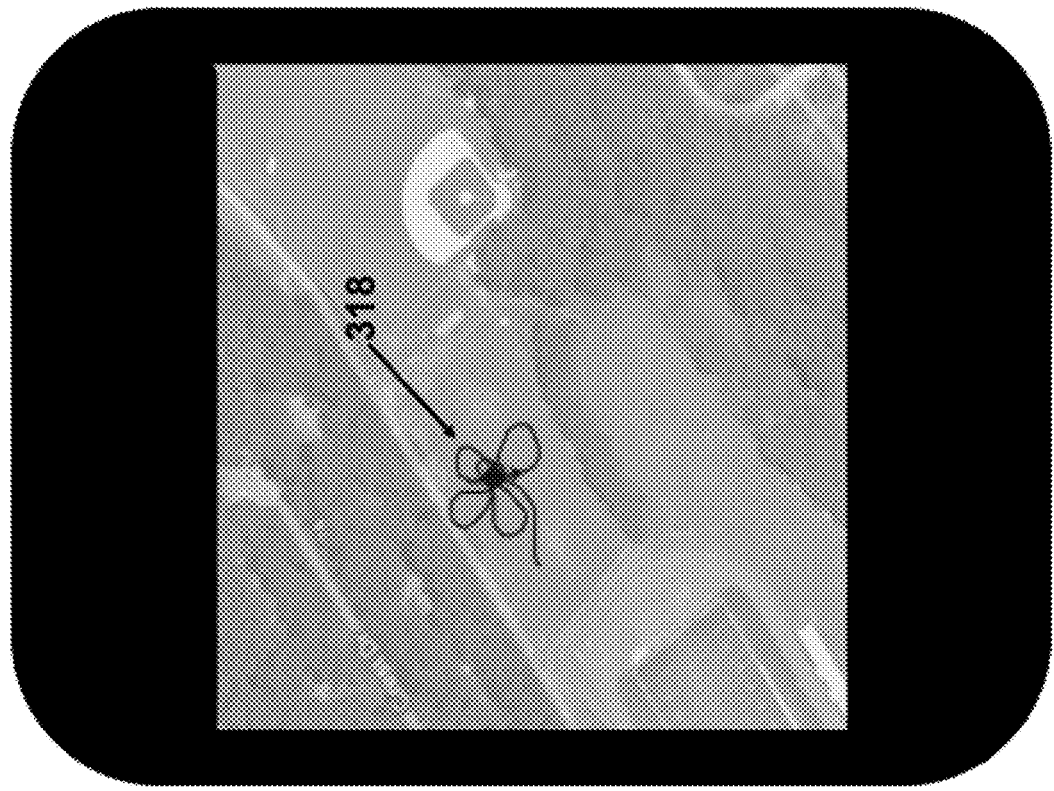
FIG. 30 is an example illustration of a flower generated via a geogame and displayed on a mobile device.

Geogames, as described herein, could be played by a single player, in solitaire mode. For example, a player could play a geogame in order to see how long the player could last as the available space grows smaller and more complex and the hazards increase in number and unpredictability. Or, in another example embodiment, in a geogame involving sketches, a player could execute ever larger and more artistic figures, such as depicted in FIG. 30, which shows a sketch of an object, a flower 318. Using multiple devices at once, and significant planning and pre-placement of devices, one can even make multi-color complex figures in solitaire mode. Solitaire mode can be played completely for its own sake, but can also be used for skills practice as preparation for multiplayer play.

Figure 31:
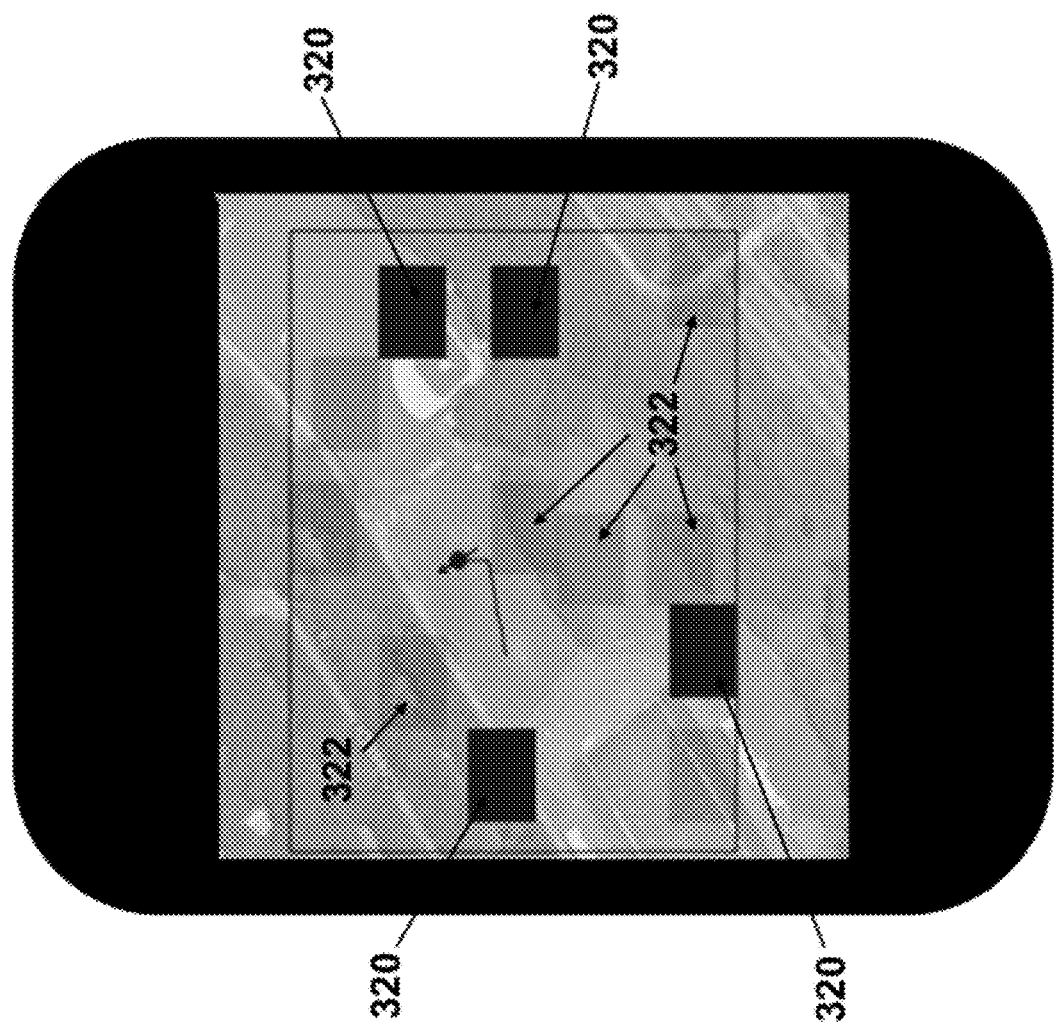
FIG. 31 is an illustration of example geogame virtual objects or elements (also referred to as pits of doom or PODs) rendered on a display of a mobile device.

FIG. 31 is an illustration of example geogame virtual objects or elements (also referred to as pits of doom or PODs) 320 and 322 rendered on a display of a mobile device. In an example embodiment, virtual obstacles or elements (PODs) 320 and 322 can be added to the geogame. This embodiment of the geogame can proceed like the non-sketching geogame described herein, including boundaries and multiple players leaving tails, except that over time PODs 320 and 322 can begin to appear in virtual world. PODs can act like boundaries in which a player is prohibited. That is, a player may not be within or in contact with a POD. And, a game player can be penalized for coming into contact with or being within a POD. A player can be considered as being within a POD or in contact with a POD when the real world location of the geogame player's device intersects the real world boundary associated with the POD. In example embodiments, a POD or multiple PODs can be introduced into the game during any appropriate time and/or step of the processes depicted in FIG. 22, FIG. 23, FIG. 24, FIG. 25 and/or FIG. 26.

In an example embodiment, a warning can be provided as a POD appears. A warning come comprise any appropriate warning, such as, for example, an audible warning, a visible warning, a mechanical warning (e.g., vibration), or the like, or any appropriate combination thereof. A player can be provided an amount of time, referred to herein as a warning period, in which to move away from a POD. A warning period is a time period that starts when a POD is first rendered. The warning period can comprise any appropriate amount of time. For example, a warning period could be 15 seconds, 30 seconds, etc. Warning periods could change during game play. For example, the longer a geogame is played, warning periods could become shorter or longer. During a warning period, a player is allowed to move away from a POD. At the end of a warning period, if a player is in contact with and/or within a POD, the player can be penalized. A penalty could include expulsion from a game, time added to game play time, a reduction in score, or the like, or any appropriate combination thereof. In an example embodiment, a player whose device is within and/or in contact with a POD, continue to lose points as long as the player device is within and/or in contact with the POD. Thus, to avoid losing more points, the player could move away from (move out of the boundary of) the POD.

In an example embodiment, a POD first appears, and remains during the warning period, as being drawn faintly as depicted by PODs 322. Note, all faintly drawn PODs in FIG. 31 are not labeled for the sake of clarity. It is to be understood, that a POD can be identified in any appropriate manner during the warning period that distinguishes it from a POD that is being rendered after the warning period (finalized). For example, a POD, during a warning period, could be color coded, highlighted, flashing, faintly drawn, displayed as wiggling or vibrating, or the like, or any appropriate combination thereof.

During game play, more and more pods finalize (exist past the warning period), the game play region can become a random maze further complicated by tails, boundaries, and PODs. In an example embodiment, PODs can move. As PODs move, real time planning and game play can become more complex. In an example embodiment, each POD's position and movements can be generated pseudo randomly, seeded by game time, for example, such that each game is different in detail. Embodiments of the herein described geogame involving PODs also can be played intense-style and/or parkour-style.

As depicted in FIG. 31, PODs 320 and 322 are shown as rectangular shaped areas. However, it is to be understood that a POD can be of any appropriate shape, and thus, is not limited to rectangular shape.

In various embodiments, PODs can be stationary, move in accordance with deterministic pattern, move randomly, chase a player, or any combination thereof.

In various example embodiments, geogames as described herein, can be played on a relatively small, open field area, such as on a football field with boundaries of tens to a few hundred meters. Since a player could sprint the length and width of the field easily, such games could tend to become intense and highly athletic. This style of geogame play could be considered intense. On the other hand, geogames as described herein could be played over larger areas having complex terrain features like forest, hills, drop-offs, fences, etc. Such geogames could require significant gymnastic skills when played at a high level, due to the need to deal with terrain. The larger area implies that players do not tend to sprint the whole time, so they may last longer and may involve more time for strategy and tactical planning. Such types of geogame play could be considered parkour-style, because the athleticism and gymnastic movements are reminiscent of parkour. Accordingly, geogames as described herein could be played as intense-style, parkour-style, neither intense-style or parkour-style, or any appropriate combination thereof. For example the style of a geogame could vary through the game.

Figure 32:
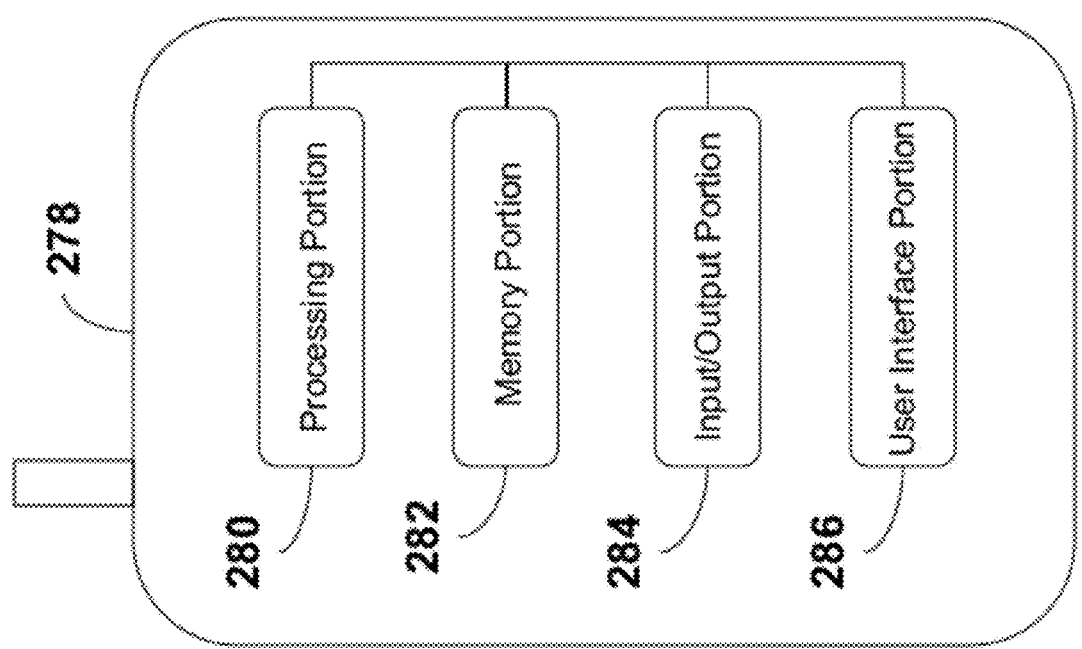
FIG. 32 is a block diagram of an example communications device (also referred to as a node, a wireless terminal (WT), a mobile device) configured to facilitate geogaming.

FIG. 32 is a block diagram of an example communications device (also referred to as a node, or wireless terminal, WT) 278 configured to facilitate geogaming. In an example configuration, communications device 278 is a mobile wireless device. The communications device 278 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkman, etc.), a portable navigation device (e.g., GPS compatible device, A-GPS compatible device, etc.), or a combination thereof. The communications device 278 can include devices that are not typically thought of as portable, such as, for example, a public computing device, a navigation device installed in-vehicle, a set top box, or the like. The mobile communications device 278 can include non-conventional computing devices, such as, for example, a kitchen appliance, a motor vehicle control (e.g., steering wheel), etc., or the like. As evident from the herein description, a node, and thus a communications device, is not to be construed as software per se.

The communications device 278 can include any appropriate device, mechanism, software, and/or hardware for facilitating a geogame as described herein. In an example embodiment, the ability to facilitate a geogame is a feature of the communications device 278 that can be turned on and off. Thus, an owner of the communications device 278 can opt-in or opt-out of this capability.

In an example configuration, the communications device 278 comprises a processing portion 280, a memory portion 282, an input/output portion 284, and a user interface (UI) portion 286. Each portion of the mobile communications device 278 comprises circuitry for performing functions associated with each respective portion. Thus, each portion can comprise hardware, or a combination of hardware and software. It is emphasized that the block diagram depiction of communications device 278 is exemplary and not intended to imply a specific implementation and/or configuration. For example, in an example configuration, the communications device 278 comprises a cellular phone and the processing portion 280 and/or the memory portion 282 are implemented, in part or in total, on a subscriber identity module (SIM) of the mobile communications device 278. In another example configuration, the communications device 278 comprises a laptop computer. The laptop computer can include a SIM, and various portions of the processing portion 280 and/or the memory portion 282 can be implemented on the SIM, on the laptop other than the SIM, or any combination thereof.

The processing portion 280, memory portion 282, and input/output portion 284 are coupled together to allow communications therebetween. In various embodiments, the input/output portion 284 comprises a receiver of the communications device 278, a transmitter of the communications device 278, or a combination thereof. The input/output portion 284 is capable of receiving and/or providing information pertaining geogaming as described above. In various configurations, the input/output portion 284 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 280 is capable of performing functions pertaining to geogaming as described above. In a basic configuration, the communications device 278 can include at least one memory portion 282. The memory portion 282 is a storage medium having a tangible physical structure. The memory portion 282 can store any information utilized in conjunction with geogaming as described above. Depending upon the exact configuration and type of processor, the memory portion 282 can be volatile (such as some types of RAM), non-volatile (such as ROM, flash memory, etc.), or a combination thereof. The mobile communications device 278 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 278.

The communications device 278 also can contain a user interface (UI) portion 286 allowing a user to communicate with the communications device 278. The UI portion 286 is capable of rendering any information utilized in conjunction with geogaming as described above. The UI portion 286 can provide the ability to control the communications device 278, via, for example, buttons, soft keys, voice actuated controls, a touch screen, movement of the mobile communications device 278, visual cues (e.g., moving a hand in front of a camera on the mobile communications device 278), or the like. The UI portion 286 can provide visual information (e.g., via a display), audio information (e.g., via speaker), mechanically (e.g., via a vibrating mechanism), or a combination thereof. In various configurations, the UI portion 286 can comprise a display, a touch screen, a keyboard, an accelerometer, a motion detector, a speaker, a microphone, a camera, a tilt sensor, or any combination thereof. The UI portion 286 can comprise means for inputting biometric information, such as, for example, fingerprint information, retinal information, voice information, and/or facial characteristic information.

The UI portion 286 can include a display for displaying multimedia such as, for example, virtual tails, players, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion can comprise a user interface (UI) application. The UI application interfaces with a client or operating system (OS) to, for example, facilitate user interaction with device functionality and data. The UI application can aid a user in entering message content, viewing received messages, answering/initiating calls, entering/deleting data, entering and setting user IDs and passwords, configuring settings, manipulating address book content and/or settings, interacting with other applications, or the like, and may aid the user in inputting selections and maneuvers associated with geogaming as described herein.

Although not necessary to implement geogaming, a communications device can be part of and/or in communications with various wireless communications networks. Some of which are described below.

Figure 33:
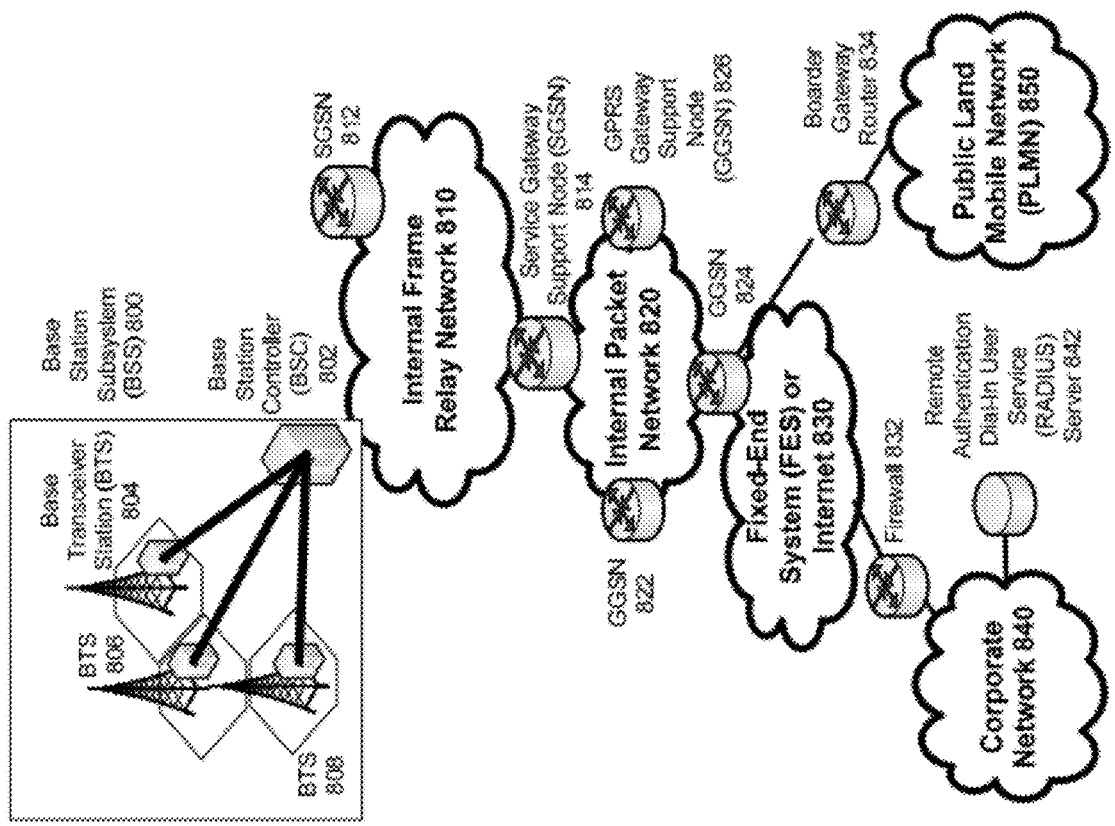
FIG. 33 depicts an overall block diagram of an example packet-based mobile cellular network environment, such as a GPRS network, within which geogaming can be implemented.

FIG. 33 depicts an overall block diagram of an example packet-based mobile cellular network environment, such as a GPRS network, within which geogaming can be implemented. In the example packet-based mobile cellular network environment shown in FIG. 33, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 34:
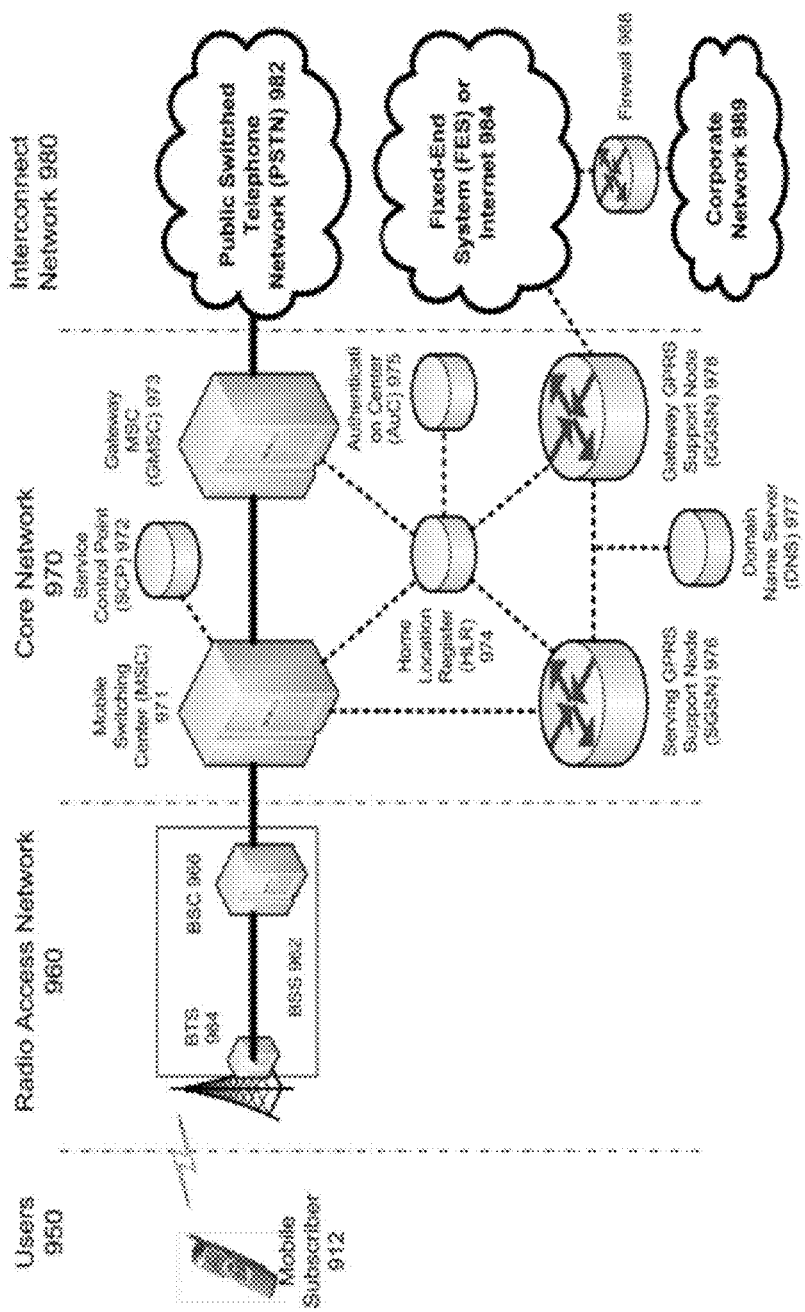
FIG. 34 illustrates an architecture of a typical GPRS network within which geogaming can be implemented.

FIG. 34 illustrates an architecture of a typical GPRS network within which geogaming can be implemented. The architecture depicted in FIG. 34 is segmented into four groups: users 950, radio access network 960, core network 970, and interconnect network 980. Users 950 comprise a plurality of end users. Note, device 912 is referred to as a mobile subscriber in the description of network shown in FIG. 34. In an example embodiment, the device depicted as mobile subscriber 912 comprises a communications device (e.g., communications device 278). Radio access network 960 comprises a plurality of base station subsystems such as BSSs 962, which include BTSs 964 and BSCs 966. Core network 970 comprises a host of various network elements. As illustrated in FIG. 34, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 34, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 34, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 35:
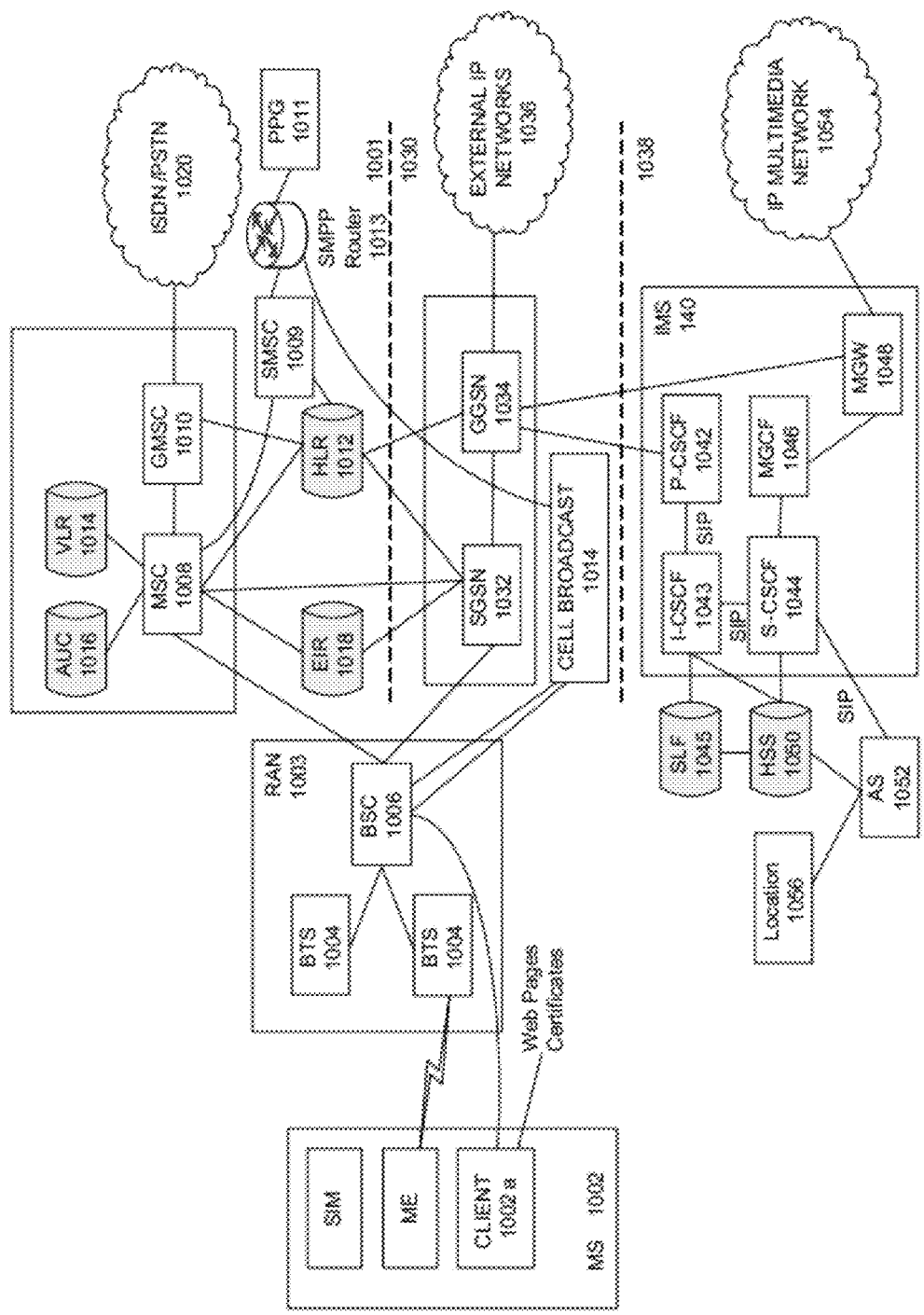
FIG. 35 illustrates an example block diagram view of a GSM/GPRS/IP multimedia network architecture within which geogaming can be implemented.

FIG. 35 illustrates an example block diagram view of a GSM/GPRS/IP multimedia network architecture within geogaming can be implemented. As illustrated, the architecture of FIG. 35 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 36:
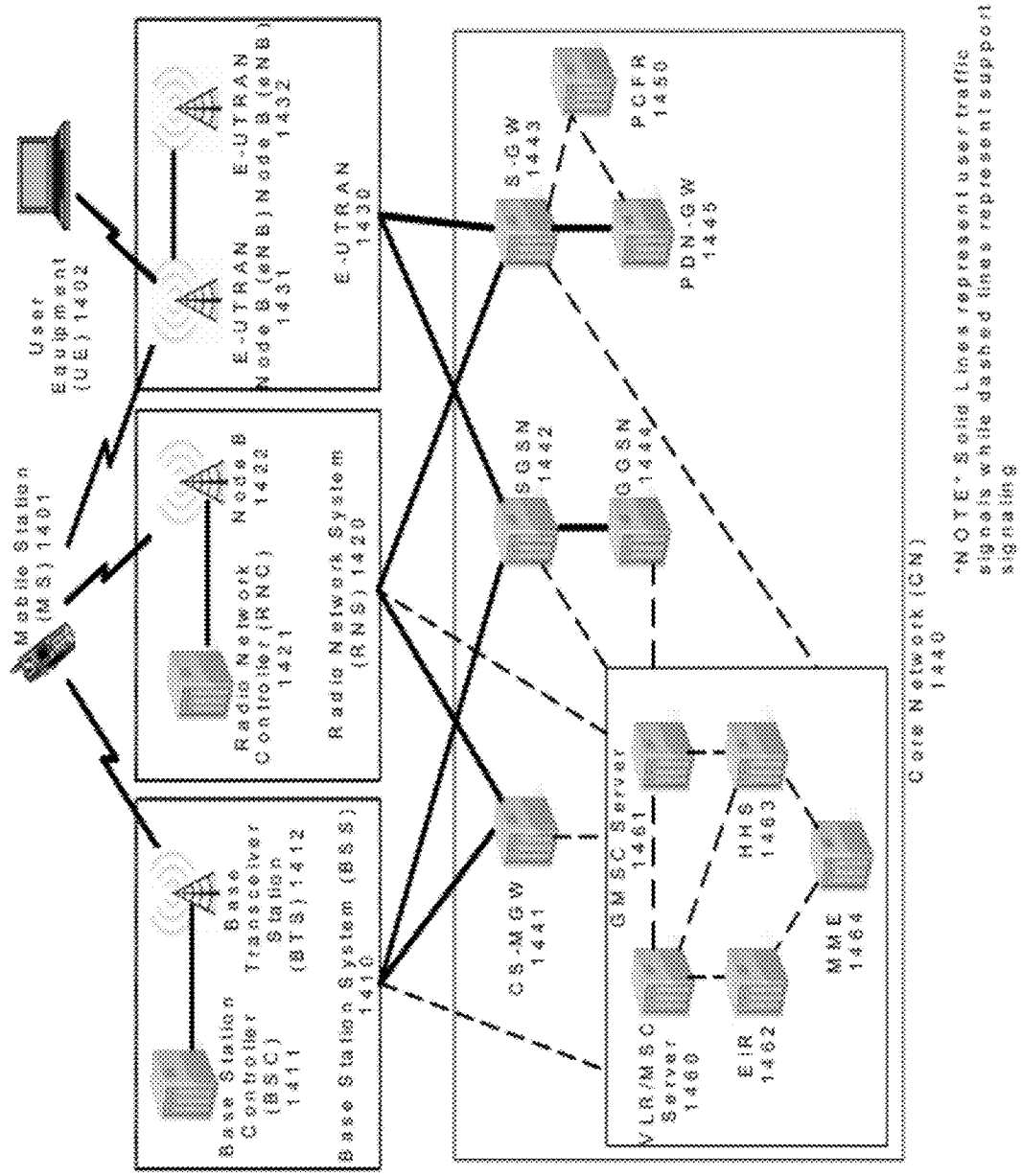
FIG. 36 illustrates a PLMN block diagram view of an example architecture in which geogaming may be incorporated.

FIG. 36 illustrates a PLMN block diagram view of an example architecture in which geogaming may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 36 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of geogaming have been described in connection with various computing devices/processors, the underlying concepts can be applied to any computing device, processor, or system capable of implementing geogames. The various techniques described herein can be implemented in connection with hardware or software or, where appropriate, with a combination of both. Thus, the methods and apparatuses of geogaming can be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal. When the program code is loaded into and executed by a machine, such as a computer, the machine becomes an apparatus for implementing geogames. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations. As evident from the herein description, a tangible storage medium is to be construed to be statutory subject matter under United States Code, Title 35, Section 101 (35 U.S.C. §101).

The methods and apparatuses for geogaming also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing geogames. When implemented on a general-purpose processor, the program code combines with the processor to provide a unique apparatus that operates to invoke the functionality of geogaming.

While geogaming has been described in connection with the various embodiments of the various figures, it is to be understood that other similar embodiments can be used or modifications and additions can be made to the described embodiments for geographic based logical message addressing and delivery without deviating therefrom. For example, one skilled in the art will recognize that geogaming as described in the present application may apply to any environment, whether wired or wireless, and may be applied to any number of such devices connected via a communications network and interacting across the network. Therefore, geogaming should not be limited to any single embodiment, but rather should be construed in breadth and scope in accordance with the appended claims.

What is claimed:

1. A device comprising:
a processor; and
memory comprising at least one executable instruction that when executed by the processor cause the processor to effectuate operations comprising:
determining a current location of the device;
generating a virtual tail for the device, the virtual tail having a first end and a second end, the first end representing a recent location of the device participating in a game, the second end representing a more recent location of the device, the virtual tail representing a path taken by the device, wherein a visual representation of the path is indicative of at least a partial sketch of a predetermined object;
geocasting a geocast message comprising an indication of the virtual tail, wherein the geocast message is formatted to comprise an internet protocol packet comprising an indication of a geographic region of intended reception instead of an identifier of an intended recipient; and
rendering, on the device, a representation of the path of the virtual tail of the device indicative of the at least partial sketch of the predetermined object.

2. The device of claim 1, the operations further comprising:
receiving geocast messages from other devices participating in the game indicative of paths of respective virtual tails of the other devices participating in the game; and
rendering, on the device, a representation of a respective path of a virtual tail of at least one other device participating in the game, wherein each respective path of a virtual tail of at the least one other device participating in the game is indicative of a respective at least partial sketch of a predetermined object.

3. The device of claim 2, wherein each path of each virtual tail of each device participating in the game is a contribution to a common sketch of the predetermined object.

4. The device of claim 1, wherein the path of the virtual tail of is indicative of the device being moved over rugged terrain.

5. The device of claim 1, wherein the path of the virtual tail of the device is indicative of the device being moved in a parkour-style manner.

6. The device of claim 1, the operations further comprising:
determining a boundary of a virtual object;
determining if the current location of the device intersects a boundary of a virtual object;
upon a determination that the current location of the device intersects the boundary of the virtual object, determining that a player utilizing the device whose current location intersects the boundary of the virtual object warrants a penalty;
geocasting an indication of the boundary of the virtual object;
rendering a first indication of the device at the current location of the device; and
rendering a second indication of the virtual object at the boundary of the virtual object.

7. The device of claim 6, the operations further comprising:
during a predetermined amount of time, upon a determination that the current location of the device intersects the boundary of the virtual object, determining that a penalty is not warranted for the player utilizing the device whose current location intersects the boundary of the virtual object; and
upon expiration of the predetermined amount of time, upon a determination that the current location of the device intersects the boundary of the virtual object, determining that a penalty is warranted for the player utilizing the device whose current location intersects the boundary of the virtual object.

8. The device of claim 7, the operations further comprising:
during the predetermined amount of time, rendering an indication of the virtual object so as to distinguish the indication of the virtual object from a rendering of the virtual object after expiration of the predetermined amount of time.

9. A method comprising:
determining a current location of a device participating in a geographic location based game;
determining a boundary of a virtual object;
generating a virtual tail for the device, the virtual tail having a first end and a second end, the first end representing a recent location of the device, the second end representing a more recent location of the device, the virtual tail representing a path taken by the device;
broadcasting a geocast message comprising an indication of the virtual tail, wherein the geocast message is formatted to comprise an internet protocol packet comprising an indication of a geographic region of intended reception instead of an identifier of an intended recipient;

determining if a device crosses the virtual tail;
upon a determination that a device crosses the virtual tail, determining that a penalty is warranted for a player utilizing a device that crossed the virtual tail;
determining if the current location of the device lies within or intersects the boundary of the virtual object; and
upon a determination that the current location of the device lies within or intersects the boundary virtual object, determining that a penalty is warranted for a player utilizing the device whose current location intersects the boundary of the virtual object.

10. The method of claim 9, wherein a path of the virtual tail is indicative of the device being moved over rugged terrain.

11. The method of claim 9, wherein a path of the virtual tail is indicative of the device being moved in a parkour-style manner.

12. The method of claim 9, further comprising:
determining a boundary for the geographic location based game;
determining if the device is within the boundary of the game;
upon a determination that the device is not within the boundary of the game, determining that a penalty is warranted for a player utilizing the device to participate in the game.

13. The method of claim 12, wherein the boundary of the geographic game represents regions located at distinct, different, physical locations.

14. The method of claim 12, further comprising rendering on the device:
a representation of the boundary of the game;
a representation of the virtual object;
a representation of a location of the boundary of the virtual object;
a representation of the device; and
a representation of a current location of a device.

15. The method of claim 9, further comprising:
during a predetermined amount of time, upon a determination that the current location of the device lies within or intersects the boundary of the virtual object, determining that a penalty is not warranted for the player utilizing the device whose boundary lies within or intersects the boundary of the virtual object; and
upon expiration of the predetermined amount of time, upon a determination that the current location of a device lies within or intersects the boundary of the virtual object, determining that a penalty is warranted for the player utilizing the device whose boundary lies within or intersects the boundary of the virtual object.

16. The method of claim 15, further comprising:
during the predetermined amount of time, rendering an indication of the virtual object so as to distinguish the indication of the virtual object from a rendering of the virtual object after expiration of the predetermined amount of time.

17. The method of claim 9, further comprising:
determining a velocity of motion of the device;
determining if the velocity of the device is equal to or less than a threshold velocity; and
upon a determination that a velocity of the device is equal to or less than the threshold velocity, determining that a penalty is warranted for a player utilizing the device to participate in the game.

18. The method of claim 9, further comprising rendering on the device, a representation of the virtual tail.

19. The method of claim 9, further comprising:
determining if the virtual tail of the device crosses a virtual tail of another device; and
upon a determination that the virtual tail of the device crosses a virtual tail of another device, determining that a penalty is warranted for a player utilizing a device whose tail has crossed another tail.

20. A computer-readable storage medium comprising instructions that when executed by a processor cause the processor to effectuate operations comprising:
receiving by a device, via a geocast message, an indication of a boundary for a geographic location based game, wherein the geocast message is formatted to comprise an internet protocol packet comprising an indication of a geographic region of intended reception instead of an identifier of an intended recipient;
determining a current location of the device;
determining if the device is within the boundary of the game;
upon a determination that the device is not within the boundary of the game, determining that a penalty is warranted for a player utilizing the device to participate in the game;
determining a boundary of a virtual object;
determining if the current location of the device lies within or intersects a boundary of the virtual object; and
upon a determination that the current location of the device lies within or intersects a boundary of a virtual object, determining that a penalty is warranted for a player utilizing the device whose boundary lies within or intersects the boundary of the virtual object.

* * * * *